US012641371B2

(12) United States Patent
Reining et al.

(10) Patent No.: US 12,641,371 B2

(45) Date of Patent: May 26, 2026

(54) ELECTRODYNAMIC ACTUATOR WITH VIBRATION COMPENSATION AND METHOD OF TUNING A SOUND SYSTEM WITH SUCH AN ACTUATOR

(71) Applicant: Sound Solutions International (Zhenjiang) Co., Ltd., Zhenjiang City (CN)

(72) Inventors: Friedrich Reining, Vienna (AT); Gustav Otto, Vienna (AT)

(73) Assignee: Sound Solutions International (Zhenjiang) Co., Ltd., Zhenjiang City (CN)

( * ) Notice: Subject to any disclaimer, the term of this patent is extended or adjusted under 35 U.S.C. 154(b) by 189 days.

(21) Appl. No.: 18/680,676

(22) Filed: May 31, 2024

(65) Prior Publication Data

US 2024/0406636 A1 Dec. 5, 2024

(30) Foreign Application Priority Data

Jun. 1, 2023 (AT) .............................. A 50432/2023

(51) Int. Cl.

*H04R 9/06* (2006.01)
*H04R 9/02* (2006.01)
*H04R 9/04* (2006.01)

(52) U.S. Cl.

CPC ............. *H04R 9/025* (2013.01); *H04R 9/046* (2013.01); *H04R 9/06* (2013.01); *H04R 2400/13* (2013.01); *H04R 2499/15* (2013.01)

(58) Field of Classification Search

CPC .......... H04R 9/025; H04R 9/046; H04R 9/06; H04R 2209/041; H04R 3/002; H04R 2400/11; H04R 2499/15

(Continued)

(56) References Cited

U.S. PATENT DOCUMENTS 11,341,948 B2 * 5/2022 Otto .................. H02K 41/0356
2002/0114486 A1 8/2002 Fukawatase et al.

(Continued)

FOREIGN PATENT DOCUMENTS

EP 1148761 A2 10/2001
KR 20040057071 A 7/2004

(Continued)

OTHER PUBLICATIONS

Austrian Patent Office, First Office Action and Search Report for counterpart AT patent application No. A50432/2023. Dated Feb. 9, 2024.

*Primary Examiner* — George C Monikang
(74) *Attorney, Agent, or Firm* — Dykema Gossett PLLC

(57) ABSTRACT

An electrodynamic actuator (1, 1*a* . . . 1*k*) is disclosed, which comprises a primary drive system (2*a*, 2*b*) with a primary voice coil (3, 3*a* . . . 3*d*) and a primary magnet system (4, 4*a*, 4*b*) and which comprises a secondary drive system (6) with a secondary voice coil (7) and a secondary magnet system (9). The secondary drive system (6) is arranged within the primary magnet system (4, 4*a*, 4*b*), and an inner center magnet (10) of the secondary magnet system (9) is arranged within the secondary voice coil (7). A movable part (33*a* . . . 33*c*) of the secondary drive system (6) comprises or is formed by the secondary voice coil (7) and/or the inner center magnet (10). Additionally, an electrodynamic transducer (23), an output device, a speaker (26) and a sound system (35) with such an electrodynamic actuator (1, 1*a* . . . 1*k*) are disclosed. The sound system (35) comprises an electronic sound signal circuit (36) for generation of a primary coil signal (SO1) fed to the primary voice coil (3, 3*a* . . . 3*d*) and of a phase shifted secondary coil signal (SO2) fed to the secondary voice coil (7).

38 Claims, 9 Drawing Sheets

(58) Field of Classification Search
USPC ................. 381/386, 400–401, 412, 414, 420
See application file for complete search history.

(56) References Cited

U.S. PATENT DOCUMENTS

| | | | |
|---|---|---|---|
| 2006/0002578 | A1 | 1/2006 | Kim et al. |
| 2020/0128331 | A1 | 4/2020 | Singer et al. |

FOREIGN PATENT DOCUMENTS

| | | | |
|---|---|---|---|
| WO | 2020181891 | A1 | 9/2020 |
| WO | 2020181892 | A1 | 9/2020 |

* cited by examiner

ELECTRODYNAMIC ACTUATOR WITH VIBRATION COMPENSATION AND METHOD OF TUNING A SOUND SYSTEM WITH SUCH AN ACTUATOR

PRIORITY

This patent application claims priority from Austrian patent application No. A 50432/2023, filed Jun. 1, 2023, entitled, "Electrodynamic Actuator with Vibration Compensation and Method of Tuning a Sound System with Such an Actuator," the disclosure of which is incorporated herein, in its entirety, by reference.

BACKGROUND

The invention relates to an electrodynamic actuator, which in particular is designed to be connected to a plate like structure or membrane, wherein the electrodynamic actuator comprises a primary drive system with at least one annular primary voice coil and an annular primary magnet system. The at least one annular primary voice coil and the annular primary magnet system each have a center opening. Furthermore, the annular primary magnet system has an annular outer center magnet. Moreover, the at least one primary voice coil has a primary electrical conductor in the shape of loops running around a primary coil axis in a primary loop section, and the primary magnet system is designed to generate a primary magnetic flux transverse to the primary electrical conductor in the primary loop section. In addition, the primary voice coil is movably coupled to the primary magnet system.

Moreover, the invention relates to an electrodynamic transducer, which comprises a plate like structure and an electrodynamic actuator of the above kind, which is connected to the plate like structure. In addition, the invention relates to an output device, wherein the aforementioned plate like structure is embodied as a display and wherein the electrodynamic actuator is connected to the backside of the display. Furthermore, the invention relates to a speaker, which comprises an electrodynamic actuator of the aforementioned kind and a membrane, which is fixed thereto.

In yet another aspect, the invention relates to a sound system, which comprises an electrodynamic actuator as defined before, an electrodynamic transducer as defined before, an output device as defined before or a speaker as defined before as well as an electronic sound signal circuit, which is designed to receive a sound input signal and to drive the aforementioned devices.

Finally, the invention relates to a method of tuning such a sound system.

An electrodynamic actuator, an electrodynamic transducer, an output device, a speaker, a sound system and a tuning method of the aforementioned kinds are generally known in prior art. In common designs, a vibration of the primary voice coil of an electrodynamic actuator also induces a vibration into fixed parts of the electrodynamic actuator and as a consequence also vibrations into a device, which the electrodynamic actuator is built into, based on the actio-reactio principle. Because these vibrations are unwanted in some applications, a vibration compensation for the above devices has been proposed. For example, a distinct mass is moved in antiphase with a movement of the primary voice coil. However, the known devices are bulky and technically complicated. Moreover, vibration compensation is done just up to a certain degree, and still some unwanted vibrations remain in common designs.

SUMMARY OF THE INVENTION

Accordingly, it is an object of the invention to overcome the drawbacks of the prior art and to provide an improved electrodynamic actuator, an improved electrodynamic transducer, an improved output device, an improved speaker, an improved sound system and an improved tuning method. In particular, devices providing vibration compensation shall be less bulky and less technically complex. Moreover, in particular the function of the vibration compensation as such shall be improved.

The problem of the invention is solved by an electrodynamic actuator as defined in the opening paragraph, wherein the electrodynamic actuator additionally comprises a secondary drive system, which comprises at least one annular secondary voice coil with a center opening and a secondary magnet system with an inner center magnet, wherein the at least one secondary voice coil has a secondary electrical conductor in the shape of loops running around a secondary coil axis in a secondary loop section and wherein the primary magnet system and the secondary magnet system are designed to generate a secondary magnetic flux transverse to the secondary electrical conductor in the secondary loop section, and wherein the secondary drive system is arranged in the center opening of the primary magnet system, and wherein the inner center magnet is arranged in the center opening of the at least one secondary voice coil and wherein a movable part of the secondary drive system, which comprises or is formed by the at least one secondary voice coil and/or the inner center magnet, is movably coupled to the primary magnet system.

The problem of the invention is also solved by an electrodynamic transducer, which comprises a plate like structure and an electrodynamic actuator of the above kind, which is connected to the plate like structure (in particular to the backside of the plate like structure opposite to a sound emanating surface of the plate like structure, wherein said backside is oriented perpendicularly to the coil axis).

In this context, it is of advantage if the at least one primary voice coil of the electrodynamic actuator comprises a flat mounting surface, which is intended to be connected to the plate like structure.

Moreover, the problem of the invention is solved by an output device, wherein the above plate like structure is embodied as a display and wherein the electrodynamic actuator is connected to the backside of the display.

Furthermore, the problem of the invention is solved by a speaker with an electrodynamic actuator of the aforementioned kind and a membrane connected thereto. In particular, the membrane is fixed to the at least one primary voice coil.

In yet another aspect, the problem of the invention is solved by a sound system as defined in the opening paragraph, wherein the electronic sound signal circuit comprises a sound input being designed to receive a sound input signal, at least one primary sound output, which is connected to the at least one primary voice coil of the electrodynamic actuator or to sub coils of said primary voice coil respectively, at least one secondary sound output, which is connected to the at least one secondary voice coil of the electrodynamic actuator or to sub coils of said secondary voice coil respectively, a primary signal processing unit in a primary signal path between the sound input and the at least one primary sound output, wherein the primary signal processing unit is designed to generate a primary coil signal based on the sound input signal and to feed the primary coil signal to the least one primary sound output and wherein the primary signal processing unit at least comprises a primary amplification stage, which is designed to amplify an input signal with a primary gain, a secondary signal processing unit in a secondary signal path between the sound input and the at least one secondary sound output, wherein the secondary signal processing unit is designed to generate a secondary coil signal based on the sound input signal and to feed the secondary coil signal to the least one secondary sound output and wherein the secondary signal processing unit at least comprises a secondary amplification stage, which is designed to amplify an input signal with a secondary gain, and a phase shifting unit, which is designed to provide a phase shift between the primary coil signal and the secondary coil signal, wherein the phase shift in particular can be in a range of 60° to 300°.

Finally, the problem of the invention is solved by a method of tuning a sound system of the above kind, comprising the steps of: a) applying a sound input signal to the sound input of the sound system; b) measuring an acceleration of the electrodynamic actuator or a device, which the electrodynamic actuator is built into, by use of an acceleration sensor, wherein the acceleration is caused by the sound input signal; c) changing the secondary gain and/or the phase shift until the measured acceleration is below a predefined threshold.

By use of the proposed measures, vibration compensated electrodynamic actuators are provided, which are less bulky and less technically complex compared to known devices. One aspect for realizing this aim is that the secondary drive system is arranged in the center opening of the primary magnet system or in other words because the drive systems are nested. The electrodynamic actuators obtained in this way are very flat. In particular, a total thickness of the electrodynamic actuator can be lower than 10 mm. Moreover, the proposed sound system and the proposed tuning method allow for improved vibration compensation as such by applying sophisticated techniques to the aforementioned electrodynamic actuators.

Generally, the acceleration of the electrodynamic actuator or a device, which the electrodynamic actuator is built into, can be measured by use of a distinct acceleration sensor, which can temporarily (i.e. during the tuning procedure) or permanently be fixed to the electrodynamic actuator or to said device. The acceleration can also be determined indirectly, in particular by using the back electromotive force, as is explained in more detail later.

Generally an "electrodynamic actuator" transforms electrical power into movement and force. An electrodynamic actuator together with a membrane forms a "speaker". An electrodynamic actuator together with a plate forms an "electrodynamic (acoustic) transducer". A special embodiment of a plate is a display. In this case, an electrodynamic actuator together with a display forms an "output device" (for both audio and video data). Generally, a speaker, an electrodynamic transducer and an output device transform electrical power into sound. Generally, the above devices may also be intended for generation of vibration for haptic feedback.

It should be noted that sound can also emanate from the backside of the plate like structure and the membrane. However, this backside usually faces an interior space of a device (e.g. a mobile phone), which the speaker or output device is built into. Hence, the plate like structure or membrane may be considered to have the main sound emanating surface and a secondary sound emanating surface (i.e. said backside). Sound waves emanated by the main sound emanating surface directly reach the user's ear, whereas sound waves emanated by the secondary sound emanating surface do not directly reach the user's ear, but only indirectly via reflection or excitation of other surfaces of a housing the device, which the speaker or output device is built into.

The electrodynamic acoustic transducer may comprise a frame and/or a housing.

A "frame" can hold together the membrane, the primary voice coil and the primary magnet system. The frame can directly be connected to the membrane and the primary magnet system (e.g. by means of an adhesive), whereas the primary voice coil is only connected to the membrane. Hence, the frame can be fixedly arranged in relation to the primary magnet system. The frame together with the membrane, the primary voice coil and the primary magnet system can form a sub system, which is the result of an intermediate step in a production process.

A "housing" can be mounted to the frame and/or to the membrane and encompasses the back volume of a transducer, i.e. an air or gas compartment behind the membrane. Hence, the housing can fixedly be arranged in relation to the primary magnet system. In common designs, the housing can be hermetically sealed respectively airtight. However, it may also comprise small openings or bass tubes as the case may be. Inter alia by variation of the back volume respectively by provision of openings in the housing, the acoustic performance of the transducer can be influenced.

The term "couple" within the disclosure in particular can mean "direct or indirect connection" (with or without intermediate parts). Accordingly, the primary voice coil can be coupled to the primary magnet system with or without intermediate parts. As well, the movable part of the secondary drive system can be coupled to the primary magnet system with or without intermediate parts. Likewise, the "connected" within the disclosure in particular can mean "direct connection" (without intermediate parts). In particular, "connected" can indicate a closer relation between connected parts, whereas "coupled" can indicate a looser relation between connected parts.

The term "annular" in the context of this disclosure generally does not only mean circular rings but also other shapes like ovals and polygons, in particular rectangles. In case of polygons, one should also note that the straight sections of the polygon are not necessarily connected by sharp corners but may also be connected by rounded corners. This definition both relates to the magnet systems and the voice coils.

Moreover, the term "annular" in the context of a magnet system and its parts does not only mean closed rings but also annular arrangements of individual segments forming a ring as a whole. The segments can touch each other, but can also be spaced from one another. In more detail, in view of the primary magnet system the above means that particularly the outer center magnet and the outer center top plate may each be formed by a single annular part or by individual parts in an annular arrangement. This particularly includes straight segments forming the straight sections of a polygon, wherein the segments may be connected or wherein the ends of the segments may be spaced from another. Such an arrangement may also comprise additional sharp or rounded corner segments, which are arranged between said straight segments. The segments may also have a more complex shape. For example, a segment forming or approximating the straight sections of a polygon may have a straight outer edge and a rounded inner edge. In particular, the magnetizing directions of the individual outer center magnets are parallel to each other. Equally, also the secondary magnet system may comprise a plurality of separate inner center magnets, the magnetizing directions of which are parallel to each other.

It is noted that the primary magnetic flux is not limited to stay only in the primary magnet system but at least partly may also go through the secondary magnet system. Equally, the secondary magnetic flux is not limited to stay only in the secondary magnet system but at least partly may also go through the primary magnet system.

Finally, it is noted that deviations from given numbers defined in the patent claims, which are unavoidable in reality due to technical tolerances, generally shall be covered by those patent claims anyway. In particular, this means that numbers defined in the patent claims are considered to include a range of +/−10% in view of the base value.

Further advantageous embodiments are disclosed in the claims and in the description as well as in the figures.

In one embodiment, the magnetizing direction of the outer center magnet and the magnetizing direction of the inner center magnet are opposed to each other. In this way, a circular magnetic flux can be obtained.

In particular, the magnetizing direction of the outer center magnet and the magnetizing direction of the inner center magnet each can be oriented parallel to the primary coil axis and/or the secondary coil axis. In this way, lateral magnetic forces between the magnets can be in equilibrium.

In one embodiment, the coupling between the primary voice coil and the primary magnet system allows a relative movement of the primary voice coil in a primary excursion direction parallel to the primary coil axis and/or the secondary coil axis. In this way, forces acting on the primary voice coil can be symmetric.

In another embodiment, the coupling between the primary magnet system and the movable part of the secondary drive system allows a relative movement of said movable part in a secondary excursion direction parallel to the primary coil axis and/or the secondary coil axis. In this way, forces acting on the movable part can be symmetric, too.

In one preferred embodiment, the primary magnet system additionally can comprise an annular outer center top plate, which is provided for guiding the primary magnetic flux and the secondary magnetic flux, wherein the outer center top plate comprises a center opening and is arranged in the center opening of the primary voice coil and axially above the outer center magnet, a bottom magnet system region, which is provided for guiding the primary magnetic flux and the secondary magnetic flux, wherein the bottom magnet system region comprises a center opening and is arranged axially below the outer center magnet and reaches radially over the primary voice coil, and a peripheral magnet system region, which is provided for guiding and/or generating the primary magnetic flux and which is arranged above the bottom region and out of the at least one primary voice coil, and wherein the outer center magnet is arranged in the center opening of the at least one primary voice coil and wherein the center openings of the outer center magnet, the outer center top plate and the bottom magnet system region form the (common connected) center opening of the primary drive system. In this way, a circular primary magnetic flux trough the primary voice coil can be generated or supported.

In the above context, the peripheral magnet system region can be annular and together with the bottom magnet system region form a single part, or can be formed by angled extensions of the bottom magnet system region, or can comprise outer magnets and at least one outer top plate, which is provided for guiding the primary magnetic flux and which is arranged axially above the outer magnets, wherein the magnetizing direction of the outer magnets each is oriented parallel to the primary coil axis and/or the secondary coil axis and opposed to the magnetizing direction of the outer center magnet. The first two options are possibilities to guide the primary magnetic flux with means having low technical complexity. Concretely, the peripheral magnet system region is part of the bottom magnet system region or forms a single part with the bottom magnet system region. The third option offers the advantage of increasing the primary magnetic flux and thus of increasing the driving force acting on the primary voice coil compared to solutions without outer magnets.

In one embodiment, which is based on the above structure with the outer magnets, the outer center magnet can be replaced by a soft iron part. There is no active generation of a magnetic field in said soft iron part, however, there is still the primary magnetic flux and the secondary magnetic flux, and accordingly the function of the altered electrodynamic actuator basically is the same as the function of the electrodynamic actuator with the outer center magnet. One advantage of using a soft iron part are the reduced costs for the electrodynamic actuator.

In yet another alternative embodiment, which is based on the above structure with the outer magnets, too, the outer center magnet is replaced by a non-iron part. For example, the outer center magnet can be replaced by a plastic part, in particular by a foamed plastic part. Accordingly, there is neither an active generation of a magnetic field nor a substantial magnetic flux in said non-iron part. One advantage of using a non-iron part is the reduced weight of the electrodynamic actuator. For a proper function, the magnetizing directions of the inner center magnet and the outer magnets have to point in opposite directions in this embodiment. There is a single circular magnetic flux through the magnet system and either the magnetic flux through the primary voice coil or through the sub coils of the secondary voice coil changes its direction based on the opposed magnetizing directions. So, one should think of the changing moving direction of the primary voice coil or the secondary voice coil and consider changing the primary current in the primary voice coil or the secondary current in the secondary voice coil as the case may be.

It is noted that the above embodiments without the outer center magnet independent of the claim 1 may form the basis for an alternative independent claim. For example, such a claim may be phrased as follows:

Electrodynamic actuator, which in particular is designed to be connected to a plate like structure or membrane, wherein the electrodynamic actuator comprises: A) a primary drive system, which comprises at least one annular primary voice coil with a center opening and an annular primary magnet system with a center opening and with outer magnets, wherein the at least one primary voice coil has an primary electrical conductor in the shape of loops running around a primary coil axis in a primary loop section and wherein the primary magnet system is designed to generate a primary magnetic flux transverse to the primary electrical conductor in the primary loop section and wherein the primary voice coil is movably coupled to the primary magnet system; and additionally comprises B) a secondary drive system, which comprises at least one annular secondary voice coil with a center opening and a secondary magnet system with an inner center magnet, wherein the at least one secondary voice coil has a secondary electrical conductor in the shape of loops running around a secondary coil axis in a secondary loop section and wherein the primary magnet system and the secondary magnet system are designed to generate a secondary magnetic flux transverse to the secondary electrical conductor in the secondary loop section, and wherein the secondary drive system is arranged in the center opening of the primary magnet system, and wherein the inner center magnet is arranged in the center opening of the at least one secondary voice coil, and wherein a movable part of the secondary drive system, which comprises or is formed by the at least one secondary voice coil and/or the inner center magnet, is movably coupled to the primary magnet system.

It is expressively noted that the above claim is just exemplary and may not construed as limiting the possibilities for making other independent claims. Further on, one shall note that the technical features, aspects and advantages resulting thereof in view of the electrodynamic transducer, the output device, the speaker, the sound system and the method of tuning a sound system without limitations are valid also in combination with the above electrodynamic actuator having the outer magnets instead of the outer center magnet. It is also noted that the dependent claims of this disclosure may form new dependent claims of the above or another new independent claim. In particular, the claims dependent on claim 1, which are directed to the electrodynamic actuator having the outer magnets, are applicable to the new independent claim 1 as the case may be. In this context, reference is particularly made to claim 7 (particularly to its third option, which is related to an embodiment having the outer magnets) and its dependent claims. Accordingly, the aforementioned new independent claim may also comprise the at least one outer top plate and other features of said paragraph. However, one has to keep in mind that dependent on the material of the part, which replaces the outer center magnet, the magnetizing directions of the inner center magnet and the outer magnets may point in the same direction or in opposite directions as has been mentioned hereinbefore.

In another preferred embodiment, the secondary magnet system additionally comprises an inner center top plate, which is provided for guiding the secondary magnetic flux and which is arranged in the center opening of the at least one secondary voice coil and axially above the inner center magnet, and an inner center bottom plate, which is provided for guiding the secondary magnetic flux and which is arranged in the center opening of the at least one secondary voice coil and axially below the inner center magnet. In this way, a circular secondary magnetic flux trough the secondary voice coil can be generated or supported.

In yet another preferred embodiment, the at least one annular secondary voice coil and the inner center magnet can be part of or can form the movable part of the secondary drive system and can be fixedly connected to each other and movably coupled to the primary magnet system, or the at least one annular secondary voice coil can fixedly be connected to the primary magnet system, and the inner center magnet can be part of or can form the movable part of the secondary drive system and can movably be coupled to the at least one annular secondary voice coil and the primary magnet system, or the inner center magnet can fixedly be connected to the primary magnet system, and the at least one annular secondary voice coil can be part of or can form the movable part of the secondary drive system and can movably be coupled to the inner center magnet and the primary magnet system. The first option offers a very high moving mass, which is active for vibration compensation. The second option offers a high moving mass, too, wherein in addition the advantage of a fixed secondary voice coil is offered. Finally, the third option offers the advantage of a fixed inner center magnet.

Generally, the coupling between the at least one annular primary voice coil and the primary magnet system can be provided by primary springs (in particular by primary spring arms). By use of primary springs and in particular by use of primary spring arms, one the one hand, a movement of the at least one annular primary voice coil can be guided, and on the other hand, a damping effect of the oscillation of the at least one annular primary voice coil can be kept low.

Alternatively or in addition, the coupling between the primary magnet system and the movable part of the secondary drive system can provided by secondary springs (in particular by secondary spring arms). By use of secondary springs and in particular by use of secondary spring arms, one the one hand, a movement of said movable part can be guided, and on the other hand, a damping effect of the oscillation of said movable part can be kept low as well.

It should be noted that nevertheless the springs can have a considerable damping effect and may (alternatively or additionally) act as dampers for the oscillating system. Accordingly, the springs may also be seen and denoted as “combined spring and damping arms”. Generally, the different functions can be influenced by giving the springs a distinct shape and/or by making them of a particular material. A spring may also be part of a superordinate spring arrangement, which for example interconnects a plurality of springs. Springs can be arranged on the top and/or on the bottom side of primary voice coil or the movable part of the secondary drive system respectively. The springs are not necessarily directly connected to the primary voice coil or to said movable part but can be connected thereto indirectly as well, e.g. by use of a housing or frame.

In an advantageous embodiment of the electrodynamic actuator, the primary springs can be provided to supply electric power to the at least one annular primary voice coil and/or the secondary springs can be provided to supply electric power to the at least one annular secondary voice coil. In this way, the springs can provide a double function. However, electric power can also be supplied by dedicated wires or the primary electrical conductor or the secondary electrical conductor respectively.

Beneficially, at least one of the annular outer center top plate, the bottom magnet system region, the peripheral magnet system region, the inner center top plate, the inner center bottom plate and/or the outer top plate can be made of soft iron. In this way, a magnetic flux can be guided at low losses.

In one embodiment, the primary coil axis and the secondary coil axis can be parallel to each other and can be spaced from each other. In another beneficial embodiment, the primary coil axis and the secondary coil axis can coincide. In this way, an electrodynamic transducer of high symmetry is provided.

Generally, the at least one primary voice coil can comprise a first primary sub coil and a second primary sub coil, which have equal shape and are stacked over one another. Equally, the at least one secondary voice coil can comprise a first secondary sub coil and a second secondary sub coil, which have equal shape and are stacked over one another. Double coil systems preferably can be used if a magnetic flux passes a voice coil twice. One should note that the term “stacked” does not necessarily mean that the sub coils touch each other, but does also include configurations where the sub coils are arranged on top of each other with a gap or with a different material in-between. In particular, there may be a glue layer between the sub coils.

It is very advantageous if a width of the outer center magnet, which is half the difference of an outer dimension of the outer center magnet in a direction perpendicular to an annular course of the outer center magnet minus the inner dimension of the outer center magnet in said direction, is in a range of 0.1 to 2.0 times the smallest extension of the inner center magnet in a direction perpendicular to the primary coil axis This configuration offers a very good vibration compensation and a high efficiency of the electrodynamic actuator at the same time.

Beneficially, the at least one secondary voice coil can have an oval shape, and the at least one primary voice coil can be rectangular with rounded corners. This configuration offers a very good vibration compensation and a high efficiency of the electrodynamic actuator at the same time as well.

In yet another very advantageous embodiment of the electrodynamic actuator, the mass of the movable part of the secondary drive system is at least two times the mass of the at least one primary voice coil. In this way, the excursion of the movable part of the secondary drive system is lower than half the excursion of the primary voice coil to equalize the momenta of the moving primary voice coil and of the movable part of the secondary drive system. So a very low electrodynamic actuator is obtained.

Beneficially, an average sound pressure level of the electrodynamic transducer or output device measured in an orthogonal distance of 10 cm from the sound emanating surface is at least 50 dB in a frequency range from 100 Hz to 15 kHz. "Average sound pressure level SPLAVG" in general means the integral of the sound pressure level SPL over a particular frequency range divided by said frequency range. In the above context, in detail the ratio between the sound pressure level SPL integrated over a frequency range from f=100 Hz to f=15 kHz and the frequency range from f=100 Hz to f=15 kHz is meant. In a more mathematical language this means $$SPL_{AVG} = \frac{\int_{f=100}^{f=15000} SPL \cdot df}{15000 - 100}$$

In an advantageous embodiment of the sound system, the secondary gain can be dependent on a frequency of the input signal of the secondary amplification stage, and/or the phase shift can be dependent on a frequency of the primary coil signal and the secondary coil signal respectively. In this way, a more sophisticated and more precise vibration compensation can be done.

Advantageously, the primary gain, the secondary gain and the phase shift can be set in a way that a total average acceleration of the electrodynamic actuator caused by a movement of the primary voice coil and the movable part of the secondary drive system is below 1 $m/s^2$, in particular in a frequency range of the sound input signal of 100 Hz to 15 kHz. In this way, an unwanted vibration induced into the electrodynamic actuator is comparably low or even zero in a perfectly tuned system. For example, the total average acceleration of the electrodynamic actuator can be measured by means of an acceleration sensor, which is temporarily or permanently fixed to the electrodynamic actuator or to the device, which the electrodynamic actuator is built into.

Alternatively, the primary gain, the secondary gain and the phase shift can be set in a way that a quotient of a primary excitation of the primary voice coil caused by the primary coil signal and a secondary excitation of the movable part of the secondary drive system caused by the secondary coil signal equals a quotient of the mass of the movable part of the secondary drive system and mass of the primary voice coil ±20%, in particular in a frequency range of the sound input signal of 20 Hz to 15 kHz. Again, an unwanted vibration induced into the electrodynamic actuator can be made comparably low or even zero in a perfectly tuned system. Here, the momenta of the primary voice coil and the movable part of the secondary drive system are used as a balancing criterion. Because the mass of the primary voice coil and said movable part can be determined easily, basically the primary excitation and the secondary excitation can be used as a balancing criterion.

In another preferred embodiment, the secondary signal processing unit can comprise a secondary filter, wherein the secondary filter is a notch filter and a ratio between a center frequency of the notch filter and a resonance frequency of a movable part of the secondary drive system is in a range of 0.9 to 1.1. Accordingly, a method of tuning a sound system can comprise the steps of: a) applying a sound input signal to the sound input of the sound system; and b) measuring a resonance frequency of the movable part of the secondary drive system and setting the center frequency of the notch filter to the measured resonance frequency. In this way, the increased excursion of the movable part due to the resonance effect at the resonance frequency of said movable part of the secondary drive system can be controlled electronically. Of course, a plurality of resonance frequencies can be damped by using a plurality of secondary filters and by tuning them to said resonance frequencies.

Alternatively, the secondary signal processing unit can comprise a secondary filter, wherein the secondary filter has a filter function or filter curve which is the inverse frequency response of the movable part of the secondary drive system. Accordingly, a method of tuning a sound system can comprise the steps of: a) applying a sound input signal to the sound input of the sound system; and b) measuring a frequency response of the movable part of the secondary drive system and setting the filter function or filter curve to the inverse frequency response. In this way, the increased excursion of the movable part due to the resonance effect at the resonance frequency of the movable part of the secondary drive system can be controlled electronically, too or even better because ideally the whole frequency response of the movable part is taken into account for tuning the secondary filter.

In a very advantageous embodiment, the secondary signal processing unit comprises means to determine a back electromotive force of the secondary coil and is designed to negatively feedback the back electromotive force or a signal derived from the back electromotive force into the secondary signal path. The back electromotive force is a voltage, which is indicative of the speed and the moving direction (up or down) of the secondary coil. If the weight of the movable part of the secondary drive system is known, the momentum, which is the product of velocity and mass, can easily be determined. In other words, the back electromotive force is also indicative of the momentum of the movable part of the secondary drive system. Because of the negative feedback, a damping effect can be realized. The negative feedback avoids under- or overexcitation of the movable part and thus imbalance of the momenta of the primary voice coil and the movable part of the secondary drive system.

For example, the secondary signal processing unit can comprise an EMF amplification stage, which is designed to generate the signal derived from the back electromotive force by amplifying the back electromotive force with an EMF gain, or an EMF phase shifting unit, which is designed to generate the signal derived from the back electromotive force by phase shifting the back electromotive force by an EMF phase shift, or a combined EMF amplification and phase shifting stage, which is designed to generate the signal derived from the back electromotive force by amplifying and phase shifting the back electromotive force with an EMF gain and an EMF phase shift respectively. By phase shifting the back electromotive force, the negative feedback can be obtained, and by setting an appropriate EMF gain, the influence of the feedback signal can be set. There may be a separate EMF amplification stage and EMF phase shifting unit or a combined EMF amplification and phase shifting stage, which provides both functions.

Generally, the EMF gain and/or the EMF phase shift can be dependent on a frequency of the back electromotive force. In this way, a more sophisticated way to provide a vibration compensation is obtained.

It should be noted at this point that using and setting a secondary filter and using the back electromotive force EMF are possibilities which can complement one another and which can thus be used in common. For example, the secondary filter can be used for roughly tune the counter momentum function, whereas the back electromotive force EMF is used for fine tuning. Moreover, the secondary filter can be used for roughly tune the counter momentum function for a series of electrodynamic actuators, whereas the back electromotive force EMF is used for fine tuning of an individual electrodynamic actuator of said series.

In yet another very advantageous embodiment of the sound system, the secondary signal processing unit can comprise a compressor, which emulates or assists to emulate a non-linear and signal level dependent excitation of the primary voice coil. Generally, there is a number of reasons why a function of a force driving the primary voice coil and its excitation is non-linear. First, the primary voice coil does not only move mass but also deforms a plate like structure or membrane. So, one (non-linear) influence is the compliance of the plate like structure or membrane, which also influences the damping of the primary oscillating system, which the primary voice coil is part of. Second, the plate like structure or membrane works against the air pressure, which is an additional (non-linear) influence. One further influence is a compliance of the primary springs. The secondary oscillating system, which the movable part of the secondary drive system is part of, has a completely different damping because of the missing plate like structure or membrane and because of different secondary springs. However, for the vibration compensation, this difference should be taken into account as well. This is done with the compressor, which emulates or assists to emulate a non-linear and signal level dependent excitation of the primary voice coil. A method of tuning a sound system, can now comprise the following steps: a) applying a sound input signal to the sound input of the sound system; b) measuring a non-linear and signal level dependent excitation of the primary voice coil; c) measuring a non-linear and signal level dependent excitation of the movable part of the secondary drive system; and d) setting a compression curve of the compressor according to a difference of the measured non-linear and signal level dependent excitation of the primary voice coil and the measured non-linear and signal level dependent excitation of the movable part of the secondary drive system. In this way, the differences between the movement of the primary voice coil and the movement of the movable part in view of their non-linearities can be compensated.

In yet another very advantageous embodiment of the sound system, the compressor is a multiband compressor emulating or assisting to emulate a non-linear, signal level dependent and frequency dependent excitation of the primary voice coil. Accordingly, a method of tuning a sound system can comprise the steps of: a) applying a sound input signal to the sound input of the sound system; b) measuring a non-linear, signal level dependent and frequency dependent excitation of the primary voice coil; c) measuring a non-linear, signal level dependent and frequency dependent excitation of the movable part of the secondary drive system; and d) setting a compression curve of the compressor according to a difference of the measured non-linear, signal level dependent and frequency dependent excitation of the primary voice coil and the measured non-linear, signal level dependent and frequency dependent excitation of the movable part of the secondary drive system. Instead of using a single band compressor, a multiband compressor, which emulates or assisting to emulate a non-linear, signal level dependent and frequency dependent excitation of the primary voice coil, is used in this embodiment. This is an even more sophisticated approach to compensate differences of the non-linearities of the oscillating systems.

It is noted that the electrodynamic actuators presented herein are not limited to be used for vibration compensation, but may also be used in applications, where sound both is transmitted via air conduction and bone conduction. For example, a headphone with an electrodynamic actuator of the disclosed kind can be placed on a user's head in a way that sound reaches the eardrum of the user over the air but is also transmitted to the cochlea via the user's skull bones. For example, a speaker of the kind disclosed herein can be used for such an application.

In this context it is also noted that the primary coil signal and the secondary coil signal may be generated based on the sound input signal in any desired way to provide a satisfying sound impression to the user. For example, some frequency bands may be more present in the primary coil signal, whereas others may be more present in the secondary coil signal. In a simple embodiment, a frequency crossover may be used to split the sound input signal into a first frequency band, on which the primary coil signal is based, and a second frequency band, on which the secondary coil signal is based. Of course, frequency bands may generally overlap. In another example, the electrodynamic actuator may be switched between air conduction and bone conduction. That means that sound is either transmitted via the air or via the user's skull bones. In the latter case, sound produced by the electrodynamic actuator may be inaudible for other persons than the user of the headphones.

Generally, the disclosed sound system in parts may be used for the air conduction/bone conduction application. For example, the primary filter, and the secondary filter may be used for this application, and other parts of the sound system may be omitted.

In another embodiment, the sound system can be used as it is for the air conduction/bone conduction application if it is not tuned for perfect vibration compensation but tweaked in a way that a remaining vibration forms the desired signal for the bone conduction. In this context, one should note that the primary voice coil, whose primary use is to produce sound audible over the air, also induces vibrations, which are audible via bone conduction. So, one has to realize that both the primary coil signal and the secondary coil signal lead to sound audible via bone conduction, and it is not the case that only the secondary coil signal produces sound audible via bone conduction. So, in a way, the air conduction/bone conduction use case may be seen as an application of the vibration compensation, which is imperfect in a desired manner. In that, the skilled in the art will understand that the whole technical disclosure is applicable to the air conduction/bone conduction use case, but the aim when tuning the sound system is not zero vibration but intended or desired vibration.

It is noted that the technical disclosure related to the air conduction/bone conduction use case without limitation also relates to the alternative independent embodiment of the electrodynamic actuator, which has outer magnets instead of the outer center magnet.

BRIEF DESCRIPTION OF THE DRAWINGS

These and other aspects, features, details, utilities, and advantages of the invention will become more fully apparent from the following detailed description, appended claims, and accompanying drawings, wherein the drawings illustrate features in accordance with exemplary embodiments of the invention, and wherein:

FIG. 17 shows a diagram with an exemplary frequency response of the movable part of the secondary drive system and an exemplary filter function derived from that; and FIG. 18 shows a diagram with nonlinear excitations of the primary voice coil and the movable part of the secondary drive system and a compression curve derived from that.

Like reference numbers refer to like or equivalent parts in the several views.

DETAILED DESCRIPTION OF EMBODIMENTS

Figure 1:
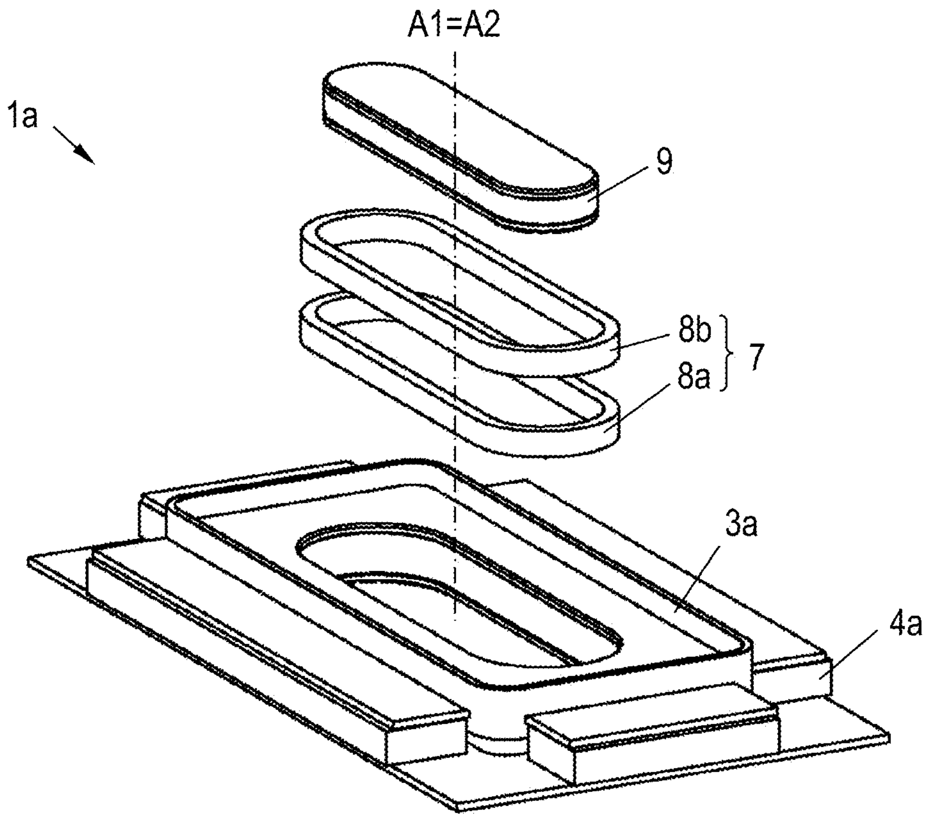
FIG. 1 shows an exploded view of a first example of an electrodynamic actuator.

Various embodiments are described herein to various apparatuses. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It must be noted that, as used in this specification and the appended claims, the singular forms "a," "an" and "the" include plural referents unless the content clearly dictates otherwise.

The terms "first," "second," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

All directional references (e.g., "plus," "minus," "upper," "lower," "upward," "downward," "left," "right," "leftward," "rightward," "front," "rear," "top," "bottom," "over," "under," "above," "below," "vertical," "horizontal," "clockwise," and "counterclockwise") are only used for identification purposes to aid the reader's understanding of the present disclosure, and do not create limitations, particularly as to the position, orientation, or use of the any aspect of the disclosure. It is to be understood that the terms so used are interchangeable under appropriate circumstances such that the embodiments of the invention described herein are, for example, capable of operation in other orientations than those illustrated or otherwise described herein.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose.

Joinder references (e.g., "attached," "coupled," "connected," and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims. Nevertheless, the term "connected" within the disclosure in particular can mean "direct connection" (without intermediate parts), and the term "couple" within the disclosure in particular can mean "direct or indirect connection" (with or without intermediate parts).

All numbers expressing measurements and so forth used in the specification and claims are to be understood as being modified in all instances by the term "about" or "substantially," which particularly means a deviation of ±10% from a reference value.

Figure 2:
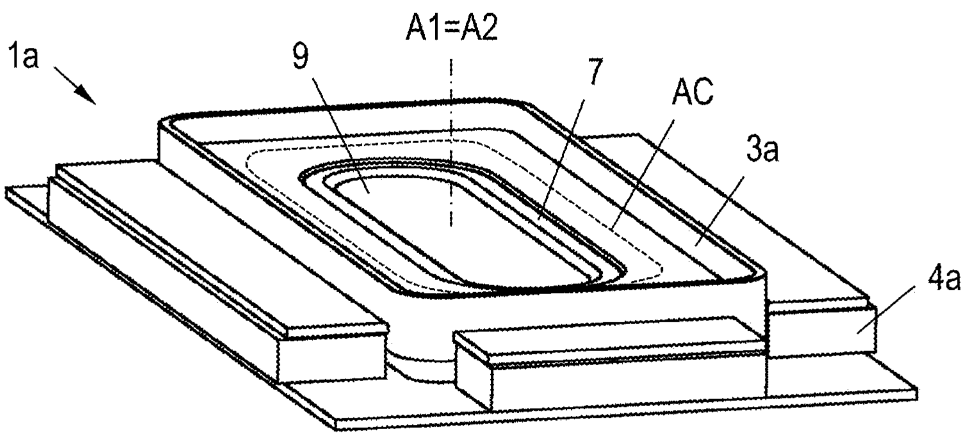
FIG. 2 shows an oblique top view of the electrodynamic actuator of FIG. 1.
Figure 3:
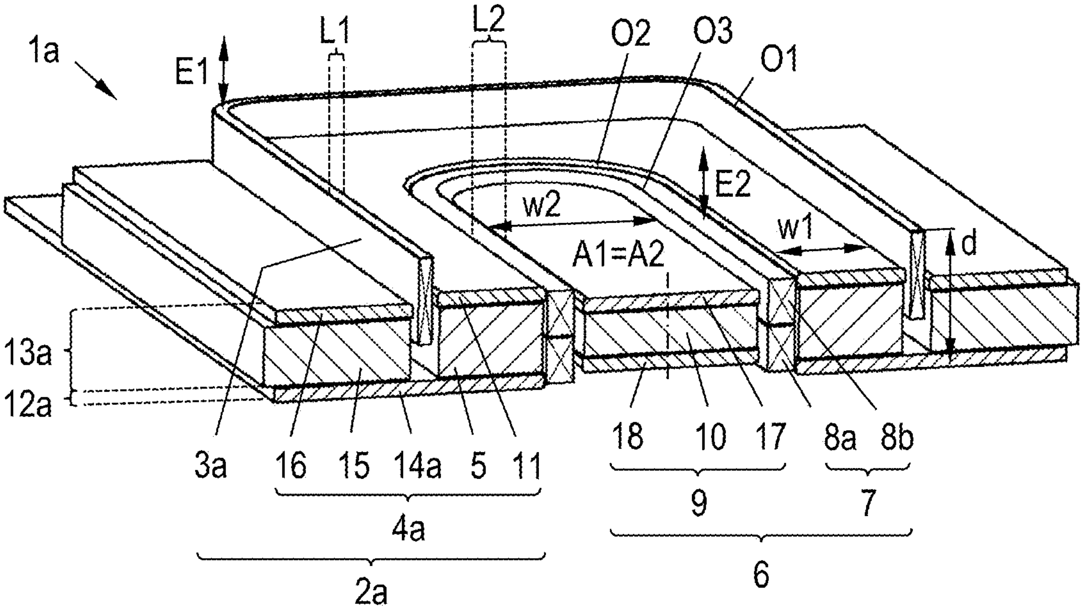
FIG. 3 shows an oblique cross sectional view of the electrodynamic actuator of FIG. 1.
Figure 4:
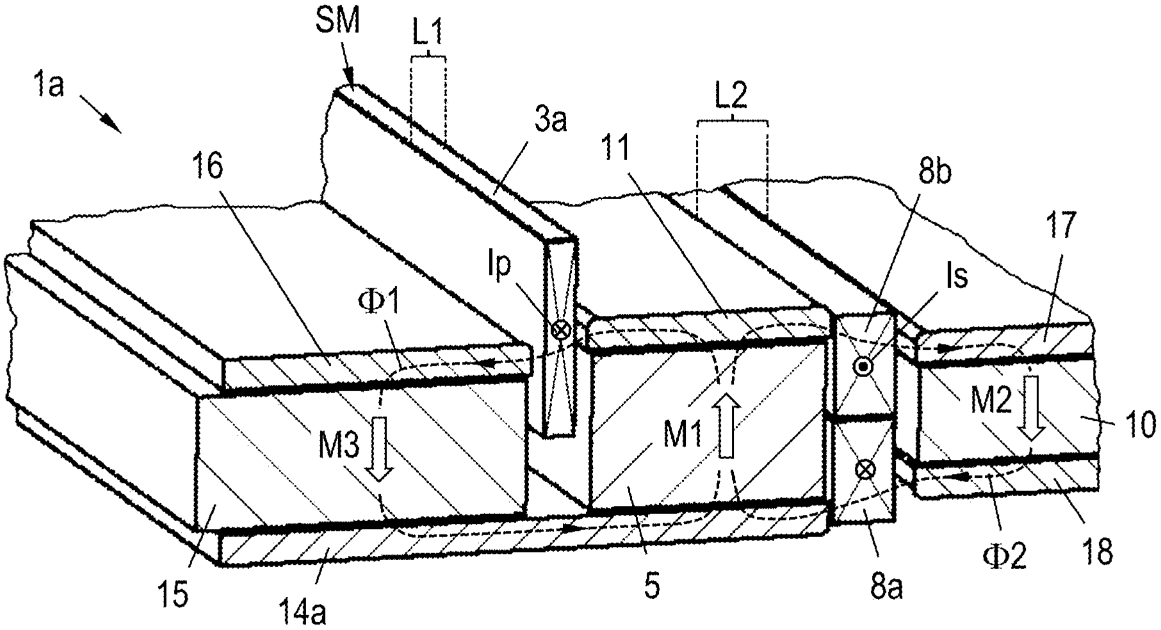
FIG. 4 shows a detailed oblique cross sectional view of the electrodynamic actuator of FIG. 1.

FIGS. 1 to 4 show different views of a first example of an electrodynamic actuator 1*a*. In detail, FIG. 1 shows an exploded view of the electrodynamic actuator 1*a*, FIG. 2 shows an oblique top view of the electrodynamic actuator 1*a*, FIG. 3 shows an oblique cross sectional view of the electrodynamic actuator 1*a* and FIG. 4 shows a detailed oblique cross sectional view of the electrodynamic actuator 1*a*.

The electrodynamic actuator 1*a* comprises a primary drive system 2*a* with an annular primary voice coil 3*a* and with an annular primary magnet system 4*a*, wherein the primary magnet system 4*a* comprises an annular outer center magnet 5. Moreover, the electrodynamic actuator 1*a* comprises a secondary drive system 6 with an annular secondary voice coil 7, wherein the secondary voice coil 7 in this example comprises a first secondary sub coil 8*a* and a second secondary sub coil 8*b*, and with a secondary magnet system 9, wherein the secondary magnet system 9 comprises an inner center magnet 10.

The first secondary sub coil 8*a* and the second secondary sub coil 8*b* have equal shape and are stacked over one another. Note that the term "stacked" in this context does not necessarily mean that the sub coils 8*a*, 8*b* touch each other, but does also include configurations where the sub coils 8*a*, 8*b* are arranged on top of each other with a gap or with a different material in-between. In particular, there may be a glue layer between the sub coils 8*a*, 8*b*.

The primary voice coil 3*a* has a center opening O1, the primary magnet system 4*a* has a center opening O2 and the secondary voice coil 7 has a center opening O3. The secondary drive system 6 is arranged in the center opening O2 of the primary magnet system 4*a*, and the inner center magnet 10 is arranged in the center opening O3 of the secondary voice coil 7. The outer center magnet 5 is arranged in the center opening O1 of the primary voice coil 3*a*.

The primary voice coil 3*a* has a primary electrical conductor in the shape of loops running around a primary coil axis A1 in a primary loop section L1. Equally, the secondary voice coil 7 has a secondary electrical conductor in the shape of loops running around a secondary coil axis A2 in a secondary loop section L2. Note that said electrical conductors are not shown in detail in FIGS. 1 to 4. The primary magnet system 4*a* is designed to generate a primary magnetic flux Φ1 transverse to the primary electrical conductor in the primary loop section L1, and the primary magnet system 4*a* together with the secondary magnet system 9 are designed to generate a secondary magnetic flux Φ2 transverse to the secondary electrical conductor in the secondary loop section L2.

One should note in this context that the primary magnetic flux Φ1 is not limited to stay only in the primary magnet system 4*a* but at least partly may also go through the secondary magnet system 9 like this is the case in the example of FIGS. 1 to 4. Equally, the secondary magnetic flux Φ2 is not limited to stay only in the secondary magnet system 9 but at least partly may also go through the primary magnet system 4*a* like this is the case in the example of FIGS. 1 to 4.

In this embodiment, the primary coil axis A1 and the secondary coil axis A2 coincide. However, in another embodiment the primary coil axis A1 and the secondary coil axis A2 can be parallel to each other and can be spaced from each other. In principle, a general relative orientation between the primary coil axis A1 and the secondary coil axis A2 is possible as well.

In the embodiment shown in FIGS. 1 to 4, the secondary voice coil 7 has an oval shape, and the primary voice coil 3*a* is rectangular with rounded corners. However, other shapes are possible as well for the primary voice coil 3*a* and the secondary voice coil 7. In particular, both may be circular.

The primary voice coil 3*a* is movably coupled to the primary magnet system 4*a*. Additionally, a movable part of the secondary drive system 6, which comprises or is formed by the at least one secondary voice coil 7 and/or the inner center magnet 10, is movably coupled to the primary magnet system 4*a*, too. In this embodiment, the coupling between the primary voice coil 3*a* and the primary magnet system 4*a* allows a relative movement of the primary voice coil 3*a* in a primary excursion direction E1 parallel to the primary coil axis A1 and/or the secondary coil axis A2. Equally, the coupling between the primary magnet system 4*a* and the movable part of the secondary drive system 6 allows a relative movement of said movable part in a secondary excursion direction E2 parallel to the primary coil A1 axis and the secondary coil axis A2. However, other orientations of the excursion directions E1, E2 are possible as well in principle.

For example, the coupling between the primary voice coil 3*a* and the primary magnet system 4*a* can be provided by primary springs, in particular by primary spring arms, and the coupling between the primary magnet system 4*a* and the movable part of the secondary drive system 6 can be provided by secondary springs, in particular by secondary spring arms. Note that the primary springs and the secondary springs are not shown in FIGS. 1 to 4, but see primary springs 31 and secondary springs 32 in FIGS. 13 to 15. The same counts for the movable part of the secondary drive system 6, which is not indicated in FIGS. 1 to 4, but see movable part 33*a* . . . 33*c* in FIGS. 13 to 15.

In a preferred embodiment, the primary springs 31 can be provided to supply electric power to the primary voice coil 3*a*, and the secondary springs 32 can be provided to supply electric power to the secondary voice coil 7. However, the primary voice coil 3*a* and the secondary voice coil 7 can also be powered by separate wires or the electrical conductors forming the loop sections L1, L2 of the primary voice coil 3*a* and the secondary voice coil 7.

In this embodiment, the magnetizing direction M1 of the outer center magnet 5 and the magnetizing direction M2 of the inner center magnet 10 each are oriented parallel to the primary coil axis A1 and the secondary coil axis A2. Moreover, the magnetizing direction M1 of the outer center magnet 5 and the magnetizing direction M2 of the inner center magnet 10 are opposed to each other. However, other orientations of the magnetizing directions M1, M2 are possible as well in principle.

In the example depicted in FIGS. 1 to 4, the primary magnet system 4*a* additionally comprises an annular outer center top plate 11, which is provided for guiding the primary magnetic flux Φ1 and the secondary magnetic flux Φ2, a bottom magnet system region 12*a*, which is provided for guiding the primary magnetic flux Φ1 and the secondary magnetic flux Φ2, and a peripheral magnet system region 13*a*, which is provided for guiding and generating the primary magnetic flux Φ1.

In detail, the bottom magnet system region 12*a* comprises a bottom plate 14*a*, and the peripheral magnet system region 13*a* comprises outer magnets 15 for generating the (or strictly speaking an additional part of the) primary magnetic flux Φ1 and an outer top plate 16, which is provided for guiding the primary magnetic flux Φ1 and which is arranged axially above the outer magnets 15. The outer center top plate 11 comprises a center opening and is arranged in the center opening O1 of the primary voice coil 3*a* and axially above the outer center magnet 5. The bottom magnet system region 12*a* comprises a center opening and is arranged axially below the outer center magnet 5 and reaches radially over the primary voice coil 3*a*. The peripheral magnet system region 13*a* is arranged above the bottom region 12*a* and out of the at least one primary voice coil 3*a*. The center openings of the outer center magnet 5, the outer center top plate 11 and the bottom magnet system region 12*a* form a common connected center opening O2 of the primary drive system 2*a*. In this embodiment, the magnetizing directions M3 of the outer magnets 15 each are oriented parallel to the primary coil axis A1 and the secondary coil axis A2 and opposed to the magnetizing direction M1 of the outer center magnet 5.

Moreover, the secondary magnet system 9 additionally comprises an inner center top plate 17 and an inner center bottom plate 18 in this embodiment. The inner center top plate 17 is provided for guiding the secondary magnetic flux Φ2 and is arranged in the center opening O3 of the at least one secondary voice coil 7 and axially above the inner center magnet 10. The inner center bottom plate 18 is provided for guiding the secondary magnetic flux Φ2 and is arranged in the center opening O3 of the at least one secondary voice coil 7 and axially below the inner center magnet 10.

Generally, the annular outer center top plate 11, the bottom magnet system region 12*a*, the peripheral magnet system region 13*a*, the inner center top plate 17, the inner center bottom plate 18 and/or the outer top plate 16 can be made of soft iron for guiding the primary magnetic flux Φ1 and the secondary magnetic flux Φ2.

The general function is as follows: The primary voice coil 3*a* is supplied with a primary coil signal, which is an electric representation of sound (e.g. music and/or speech). In turn the primary voice coil 3*a* is moved upwards and downwards according to the primary coil signal and transfers its movement to a plate like structure or the membrane. For this reason, the primary voice coil 3*a* can comprise a flat mounting surface SM, which is intended to be connected to the plate like structure or the membrane (see FIGS. 11 and 12 for details). In turn, the primary coil signal is converted into audible sound by the plate like structure or membrane.

In common designs, the movement of the primary voice coil 3*a* and the plate like structure or membrane causes a counter force, which induces an unwanted vibration into the whole electrodynamic actuator 1*a*, which may also be transferred into a device, which the electrodynamic actuator 1*a* is built into. To reduce or even avoid said effect, roughly speaking, the movable part of the secondary drive system 6 is moved in counterphase to the primary voice coil 3*a*. To provide this movement, the secondary voice coil 7 is supplied with a suitable secondary coil signal. In FIG. 4, the directions of the primary current Ip in the primary voice coil 3*a* and the secondary currents Is in the sub coils 8*a*, 8*b* of the secondary voice coil 7 shall visualize said counteracting. For details how the primary coil signal and the secondary coil signal are generated, see FIGS. 16 to 18 and the explanation associated therewith.

The proposed design in particular refers to "small" electrodynamic actuators 1*a* with a total thickness d being lower than 10 mm. It is also of advantage, if a width w1 of the outer center magnet 5, which is half the difference of an outer dimension of the outer center magnet 5 in a direction perpendicular to an annular course AC of the outer center magnet 5 minus the inner dimension of the outer center magnet 5 in said direction, is in a range of 0.1 to 2.0 times the smallest extension w2 of the inner center magnet 10 in a direction perpendicular to the primary coil axis A1. This configuration offers a very good vibration compensation and a high efficiency of the electrodynamic actuator 1*a* at the same time.

Moreover, it is of advantage, if the mass of the movable part of the secondary drive system 6 is at least two times the mass of the primary voice coil 3*a*. In this way, the excursion of the movable part of the secondary drive system 6 is lower than half the excursion of the primary voice coil 3*a* to equalize the momenta of the moving primary voice coil 3*a* and of the movable part of the secondary drive system 6.

In an alternative embodiment, which basically is based on the structure depicted in the FIGS. 1 to 4, the outer center magnet 5 is replaced by a soft iron part. There is no active generation of a magnetic field in said soft iron part, however, there is still the primary magnetic flux Φ1 and the secondary magnetic flux Φ2 as depicted, and accordingly the function of the altered electrodynamic actuator 1*a* basically is the same as the function of the electrodynamic actuator 1*a* with the outer center magnet 5.

In yet another alternative embodiment, which basically is based on the structure depicted in the FIGS. 1 to 4, too, the outer center magnet 5 is replaced by a non-iron part. For example, the outer center magnet 5 can be replaced by a plastic part, in particular by a foamed plastic part. Accordingly, there is neither an active generation of a magnetic field nor a substantial magnetic flux in said non-iron part. For a proper function, the magnetizing directions M2, M3 have to point in opposite directions in this embodiment. So, for example, the magnetizing direction M2 can point upwards instead of downwards in FIG. 4. Accordingly, the secondary magnetic flux Φ2 changes its direction, too, and so there is a single circular magnetic flux in the counterclockwise direction through the inner center magnet 10, the inner center top plate 17, the annular outer center top plate 11, the outer top plate 16, the outer magnets 15, the bottom plate 14*a* and the inner center bottom plate 18. Because the direction of the single circular magnetic flux through the sub coils 8*a*, 8*b* of the secondary voice coil 7 changes as well, one has to keep in mind the altered moving direction of the secondary voice coil 7 and to flip the secondary currents Is in the sub coils 8*a*, 8*b* as the case may be. It is also possible that the magnetizing direction M3 points upwards instead of downwards in FIG. 4. Accordingly, then there is a single circular magnetic flux in the clockwise direction through the inner center magnet 10, the inner center bottom plate 18, the bottom plate 14*a*, the outer magnets 15, the outer top plate 16, the annular outer center top plate 11 and the inner center top plate 17. Because the direction of the single circular magnetic flux through the primary voice coil 3*a* changes in this case, one has to keep in mind the altered moving direction of the primary voice coil 3*a* and to change the primary current Ip in the primary voice coil 3*a* as the case may be.

Figure 5:
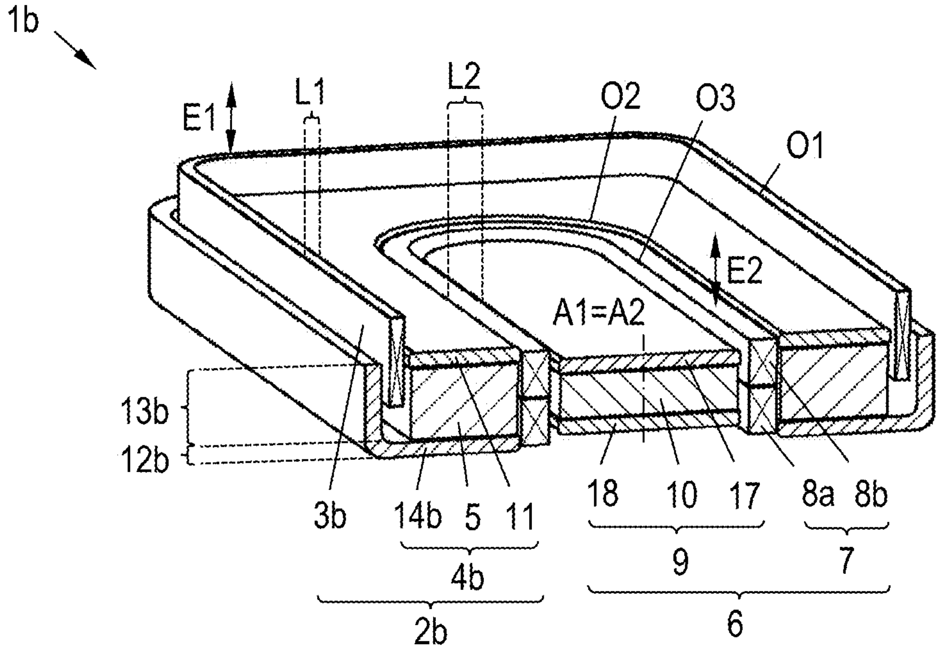
FIG. 5 shows an oblique cross sectional view of a second example of an electrodynamic actuator.
Figure 6:
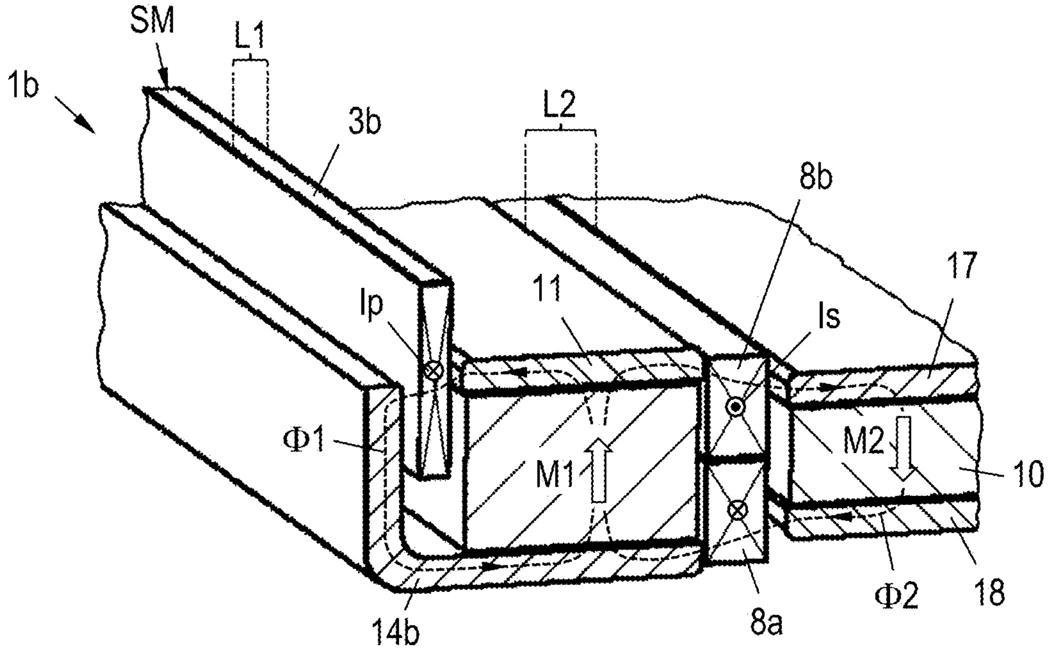
FIG. 6 shows a detailed oblique cross sectional view of the electrodynamic actuator of FIG. 5.

FIGS. 5 and 6 now show a further embodiment of an electrodynamic actuator 1*b*, which is similar to the electrodynamic actuator 1*a* depicted in FIGS. 1 to 4. Similar to FIGS. 3 and 4, FIG. 5 shows an oblique cross sectional view of the electrodynamic actuator 1*b*, and FIG. 6 shows a detailed oblique cross sectional view of the electrodynamic actuator 1*b*. In contrast to the electrodynamic actuator 1*a*, the peripheral magnet system region 13*b* of the electrodynamic actuator 1*b* is annular and together with the bottom magnet system region 12*b* forms a single part. Moreover, there is no outer magnet 15 and no outer top plate 16. Nevertheless, the function of the electrodynamic actuator 1*b* basically equals the function of the electrodynamic actuator 1*a*.

Figure 7:
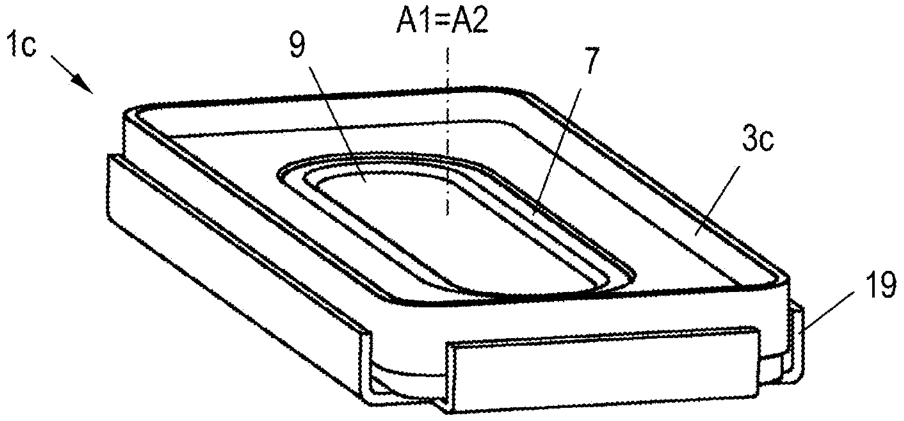
FIG. 7 shows an oblique top view of an electrodynamic actuator with a peripheral magnet system region formed by angled extensions.

FIG. 7 shows another embodiment of an electrodynamic actuator 1*c*, which is similar to the electrodynamic actuator 1*b*. In contrast, the peripheral magnet system region of the electrodynamic actuator 1*c* is formed by angled extensions 19 of the bottom magnet system region 12*c*. Again, the function of the electrodynamic actuator 1*c* basically equals the function of the electrodynamic actuators 1*a* and 1*b*.

Figure 8:
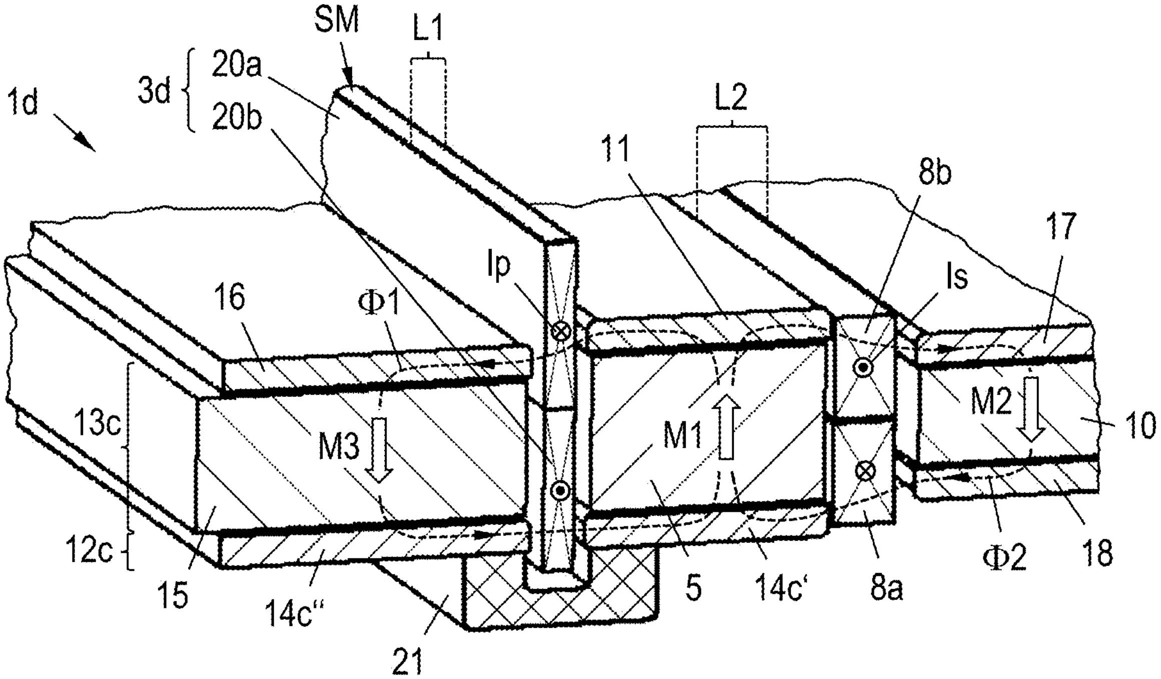
FIG. 8 shows a detailed oblique cross sectional view of an electrodynamic actuator with split bottom plate.

FIG. 8 shows a detailed oblique cross sectional view of another electrodynamic actuator 1*d*, which is similar to the electrodynamic actuator 1*a* depicted in FIGS. 1 to 4. In contrast, the bottom plate is split into a center bottom plate 14*c*' and an outer bottom plate 14*c*", which are connected by a primary bridge part 21. The primary bridge part 21 shall not guide the primary magnetic flux Φ1 and can be made of plastic. A further difference is that the primary voice coil 3*d* comprises a first primary sub coil 20*a* and a second primary sub coil 20*b*, which have equal shape and are stacked over one another. The considerations made to the term "stacked" in view of the secondary voice coil 7 and its sub coils 8*a*, 8*b* equally apply to the primary voice coil 3*d* and its sub coils 20*a*, 20*b*. Again, the function of the electrodynamic actuator 1*d* is very similar to the function of the electrodynamic actuator 1*a*. However, the primary magnetic flux Φ1 passes the primary voice coil 3*d* twice in this embodiment. It should be noted that that the structure of the electrodynamic actuator 1*d* also relates to embodiments, where the outer center magnet 5 is replaced by a soft iron part or a non-iron part. The technical disclosure made to the electrodynamic actuator 1*a* in this context equally relates to the electrodynamic actuator 1*d*.

Figure 9:
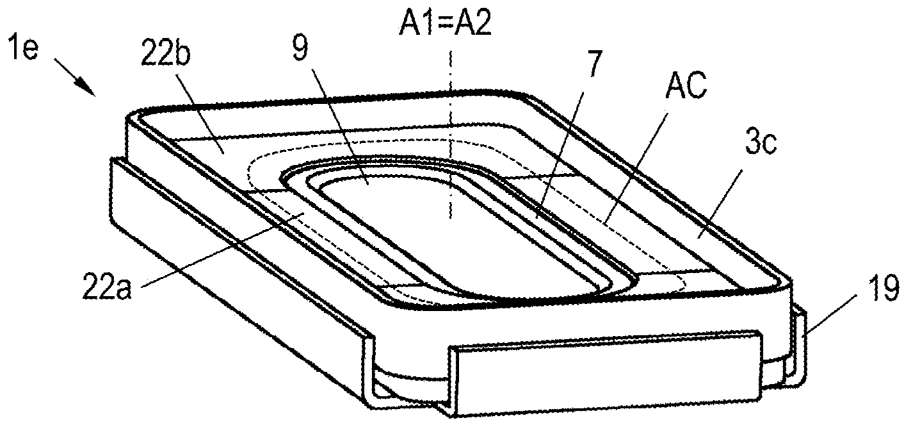
FIG. 9 shows a first example of an electrodynamic actuator with a segmented primary magnet system.

The term "annular" in the context of the primary magnet system 4*a*, 4*b* and its parts does not only mean closed rings but also annular arrangements of individual segments forming a ring as a whole. In this context, FIG. 9 shows an embodiment of an electrodynamic actuator 1*e*, which is similar to the electrodynamic actuator 1*c* but where the primary magnet system comprises segments 22*a*, 22*b* forming a ring as a whole. In detail, the outer center magnet 5 and the outer center top plate 11 may each be formed by individual segments 22*a*, 22*b* in an annular arrangement, wherein the magnetizing directions M1 of the individual outer center magnets 5 are oriented parallel to each other. In this embodiment, the segments 22*a*, 22*b* form the straight sections of a polygon. In more detail, the segments 22*a* form straight sections of a polygon, whereas strictly speaking the segments 22*b* approximate the straight sections of the polygon and have a straight outer edge and a rounded inner edge. In contrast, the segments 22*a* are basically cuboid.

Figure 10:
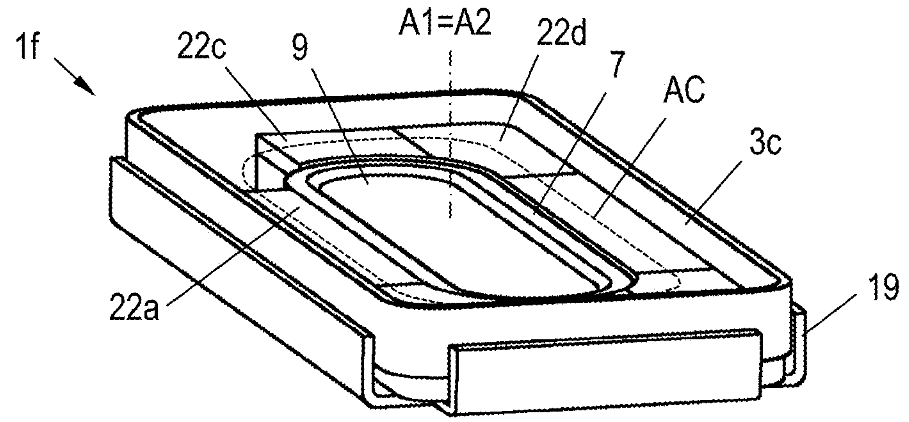
FIG. 10 shows a second and third example of an electrodynamic actuator with a segmented primary magnet system.

Generally, the segments 22*a*, 22*b* can touch each other, but can also be spaced from one another. In this context, FIG. 10 shows another example of an electrodynamic actuator 1*f*, which is similar to the electrodynamic actuator 1*e* of FIG. 9. In detail, FIG. 10 is a combined visualization of two different embodiments. In one embodiment, there are straight segments 22*a* and 22*c* only, wherein the corner region is left out (see upper left corner in FIG. 10). In another embodiment, there are additional corner segments 22*d* (see the remaining three corners in FIG. 10).

Although the primary magnet system of the electrodynamic actuators 1*e*, 1*f* is a bit different, their function basically equals the function of the electrodynamic actuator 1*c* of FIG. 7. One should also note that the technical disclosure in view of segments 22*a* . . . 22*d* equally applies to the peripheral magnet system regions 13*a* . . . 13*c* which may be segmented in the same way. Further on, the secondary magnet system 9 may comprise a plurality of separate inner center magnets 10, the magnetizing directions M2 of which are parallel to each other.

One should note that a segmentation of the outer center magnet 5, the inner center magnet 10 and/or the outer magnet 15 does not necessarily imply a segmentation of the associated outer center top plate 11, the associated bottom plate 14*a* . . . 14*c*", the associated outer top plate 16, the associated inner center top plate 17 and/or the associated inner center bottom plate 18 and vice versa. For example, this means that the outer center magnet 5 can be realized by simple cuboids, whereas the outer center top plate 11 is made of a single annular piece without any segmentations. Equally, this means that the outer center top plate 11 can be realized by single plates, whereas the outer center magnet 5 is made of a single annular piece without any segmentations. The same counts for the bottom plate 14*a*, 14*b*, 14*c*', which can be segmented or can be made of a single annular piece independently of a segmentation of the outer center magnet 5 and the outer center top plate 11. The same is true for the inner center magnet 10, the inner center top plate 17 and the inner center bottom plate 18, and the same is true for the outer magnet 15, the outer top plate 16 and the bottom plate 14*a*, 14*b*, 14*c*".

Figure 11:
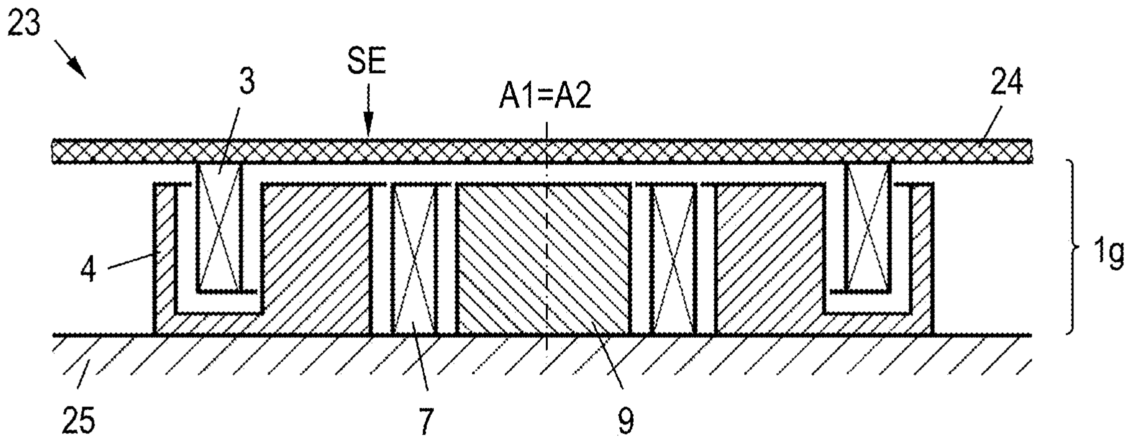
FIG. 11 shows a cross sectional view of an example of an electrodynamic transducer.

FIG. 11 now shows a cross sectional view of an example of an electrodynamic transducer 23, which comprises a plate like structure 24 and an electrodynamic actuator 1*g* of the kind disclosed hereinbefore, wherein the electrodynamic actuator 1*g* is connected to the plate like structure 24 by means of a glue layer or adhesive sheet (not shown in FIG. 11). For this reason, the electrodynamic actuator 1*g* advantageously comprises a flat mounting surface SM on the primary voice coil 3, which is intended to be connected to the plate like structure 24. In particular, the plate like structure 24 has a sound emanating surface SE and a backside opposite to the sound emanating surface SE, wherein the electrodynamic actuator 1*g* is connected to said backside. The non-moving part of the electrodynamic actuator 1*g* is fixed to a mounting base 25 in this example.

The plate like structure 24 can be a passive structure, for example a part of a housing of a device, which the electromagnetic actuator 1*g* is built into. The same counts for the mounting base 25, which can be a part of a housing of said device, too. The plate like structure 24 can also have a special function itself. For example, if the plate like structure 24 is embodied as a display, the electrodynamic actuator 1*g* together with the display forms an output device (for both audio and video data).

Figure 12:
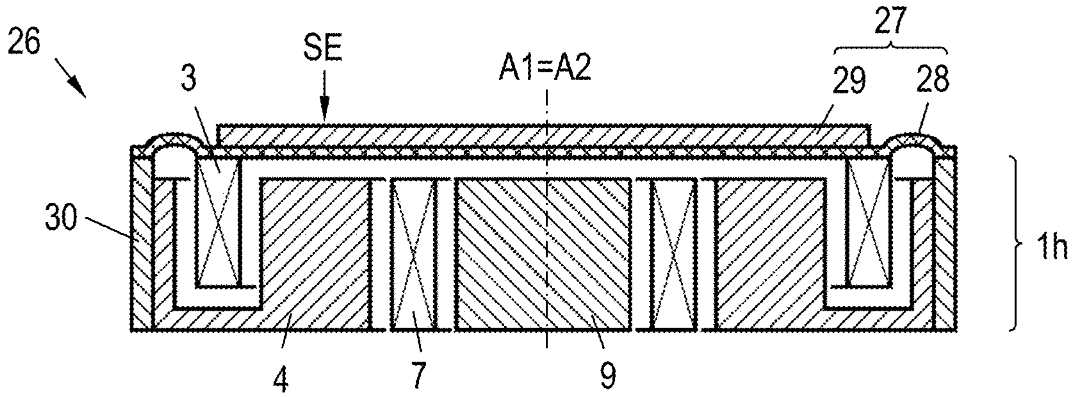
FIG. 12 shows a cross sectional view of an example of a speaker.

FIG. 12 now shows a cross sectional view of an example of a speaker 26, which comprises an electrodynamic actuator 1*h* of the kind disclosed hereinbefore and a membrane 27, which is fixed to the primary voice coil 3 by means of a glue layer or adhesive sheet. For this reason, again the electrodynamic actuator 1*h* advantageously can comprise a flat mounting surface SM on the primary voice coil 3, which is intended to be connected to the membrane 27.

The membrane 27 comprises a flexible membrane part 28 and an optional rigid membrane part 29 in this embodiment. The rigid membrane part 29 mainly moves in the piston mode (i.e. just up and down in primary excursion direction E1), whereas the flexible membrane part 28 is bent. In contrast to a membrane 27, a plate like structure 24 in the sense of the example shown in FIG. 11 has no dedicated flexible part like the flexible membrane part 28. Accordingly, there is no extreme separation of deflection and piston movement like it is the case for the flexible membrane part 28 (deflection) and a rigid membrane part 29 (piston movement). Instead, sound generation is done via deflection of the whole plate like structure 24 in case of the example shown in FIG. 11.

However, it should also be noted at this point that a display forming a plate like structure 24 in FIG. 11 may be connected elastically to a housing of the device, which the display is part of. In such a case, the display may be seen as the rigid membrane part 29 of a membrane 27, wherein the display mainly moves in the piston mode, too. Accordingly, borders between an electrodynamic transducer 23 and a speaker 26 can blur into one another in such a case.

In general, a speaker 26 or an electrodynamic transducer 23 (or output device) of the kind disclosed hereinbefore preferably produces an average sound pressure level of at least 50 dB_SPL in a frequency range from 100 Hz to 15 kHz measured in an orthogonal distance of 10 cm from the sound emanating surface SE. In particular, the above average sound pressure level is measured at 1 W electrical power more particularly at the nominal impedance.

Figure 13:
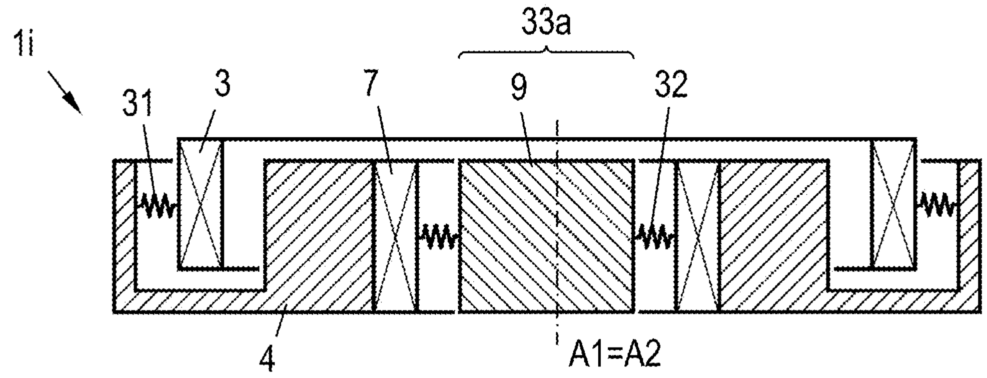
FIG. 13 shows a schematic cross sectional view of an electromagnetic actuator with a fixed secondary voice coil and with the inner center magnet being movable.
Figure 14:
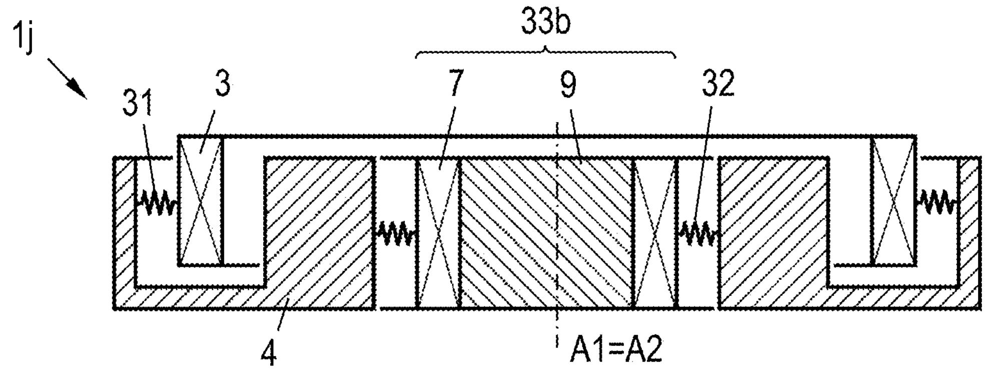
FIG. 14 shows a schematic cross sectional view of an electromagnetic actuator with a movable secondary voice coil and with a movable inner center magnet.
Figure 15:
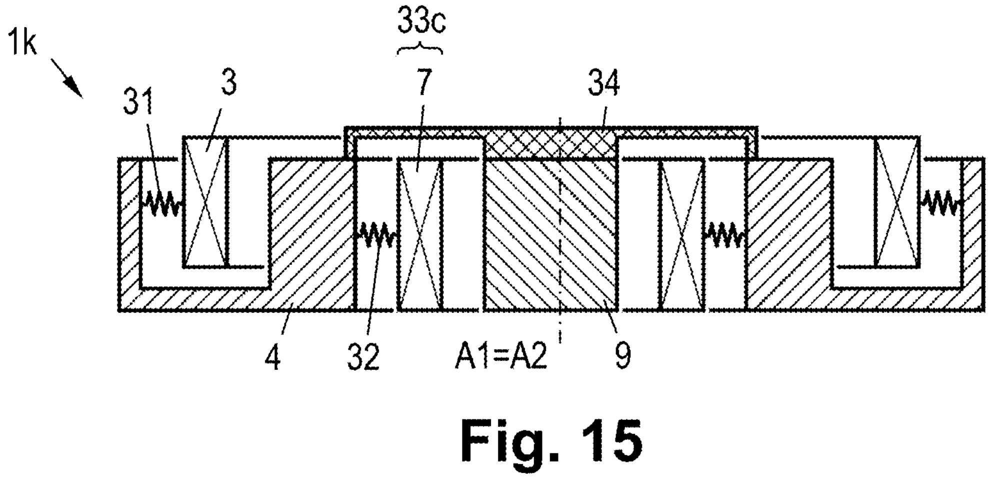
FIG. 15 shows a schematic cross sectional view of an electromagnetic actuator with a movable secondary voice coil and with a fixed inner center magnet.

FIGS. 13 to 15 now show variants how the movable part 33*a* . . . 33*c* of the secondary drive system 6 can be formed. FIG. 13 shows a schematic cross sectional view of an electromagnetic actuator 1*i*, where the coupling between the primary voice coil 3 and the primary magnet system 4 is provided by primary springs 31. The primary springs 31 are schematically drawn in FIG. 13 and are commonly not embodied as helical springs but by primary spring arms, which are made of an elastic material (e.g. spring steel) and which mainly extend in a plane perpendicular to the primary coil axis A1.

In the embodiment shown in FIG. 13, the secondary voice coil 7 is fixedly connected to the primary magnet system 4, and the inner center magnet 10 (together with the inner center top plate 17 and the inner center bottom plate 18) is part of the movable part 33*a* of the secondary drive system 6. In this embodiment, the movable part 33*a* is movably coupled to the secondary voice coil 7 and the primary magnet system 4. In more detail, the movable part 33*a* is indirectly coupled to the primary magnet system 4 via the secondary voice coil 7 in this example. Said coupling is provided by secondary springs 32. The secondary springs 32 are schematically drawn in FIG. 13 and are commonly not embodied as helical springs but by secondary spring arms, which are made of an elastic material (e.g. spring steel) and which mainly extend in a plane perpendicular to the secondary coil axis A2. For example, the secondary spring arms may connect to the inner center top plate 17 or the inner center bottom plate 18.

FIG. 14 shows an electromagnetic actuator 1*j*, which is similar to the electromagnetic actuator 1*i* shown in FIG. 13. In contrast, the annular secondary voice coil 7 and the inner center magnet 10 together are part of the movable part 33*b* of the secondary drive system 6. The inner center top plate 17 and the inner center bottom plate 18 can be further parts of the movable part 33*b*. Beneficially, the mass of the movable part 33*b* is higher than the mass of the movable part 33*a*. Accordingly, it moves less for producing the same momentum.

Finally, FIG. 15 shows an electromagnetic actuator 1*k*, which is similar to the electromagnetic actuator 1*i* shown in FIG. 13, too. In contrast, the inner center magnet 10 is fixedly connected to the primary magnet system 4, and the secondary voice coil 7 forms the movable part 33*c* of the secondary drive system 6. The connection between the inner center magnet 10 and the primary magnet system 4 is made by a secondary bridge part 34, which is arranged on the upper side of the electrodynamic actuator 1*k* but which may also be mounted on its bottom side.

Figure 16:
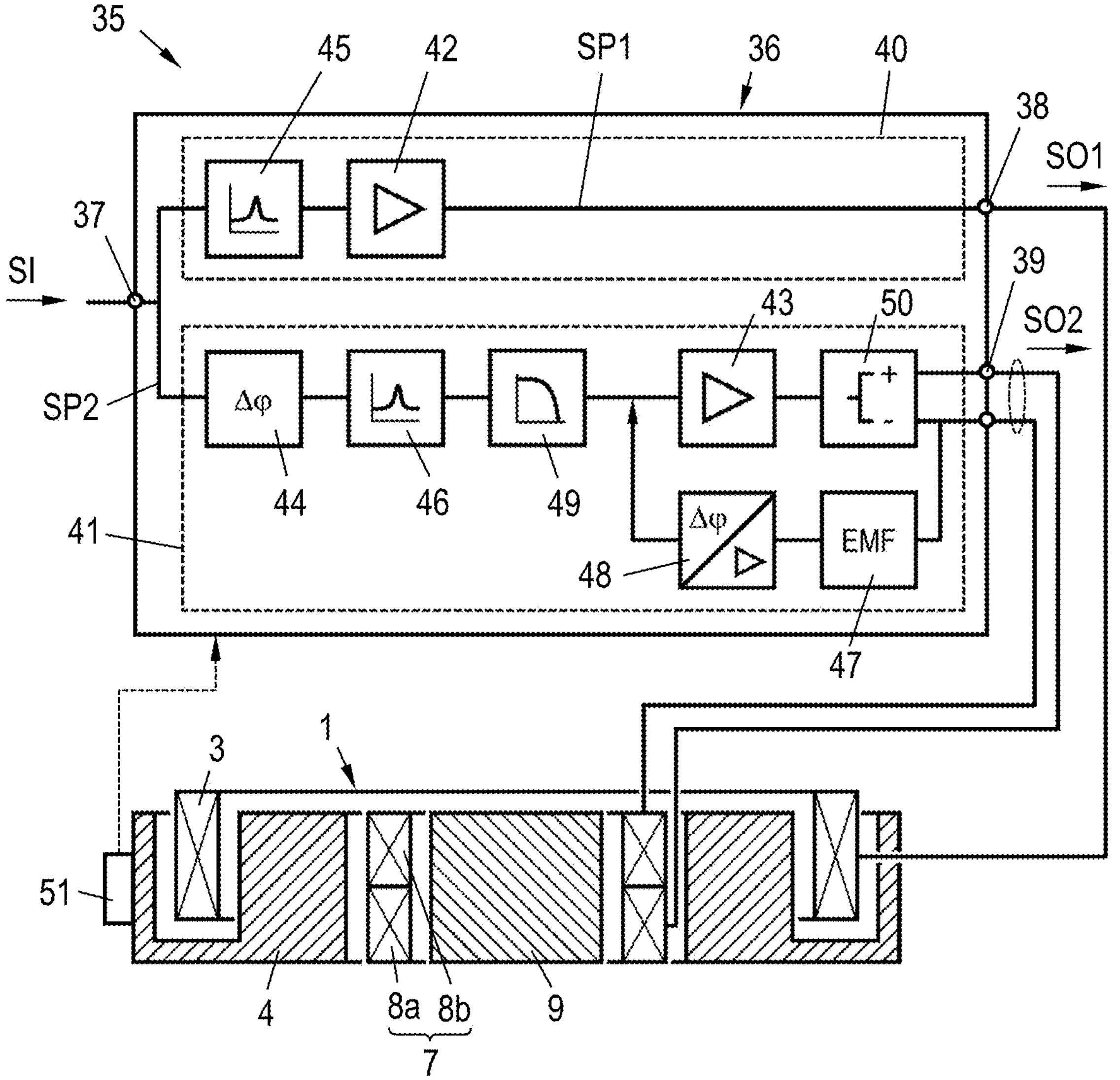
FIG. 16 shows a schematically drawn sound system.

FIG. 16 now shows a schematically drawn sound system 35, which comprises an electrodynamic actuator 1 of the aforementioned kind (as part of an electrodynamic transducer 23, an output device or a speaker 26 as the case may be) and an electronic sound signal circuit 36. The electronic sound signal circuit 36 comprises a sound input 37, a primary sound output 38 and a secondary sound output 39. The sound input 37 is designed to receive a sound input signal SI and can be connected to a source of said sound input signal SI. Such a source may be a digital analog converter receiving digital sound data. The primary sound output 38 is connected to the primary voice coil 3 of the electrodynamic actuator 1 or to sub coils 20*a*, 20*b* of said primary voice coil 3 respectively. The secondary sound output 39 is connected to the at least one secondary voice coil 7 of the electrodynamic actuator 1 or to sub coils 8*a*, 8*b* of said secondary voice coil 7 respectively.

Moreover, the electronic sound signal circuit 36 comprises a primary signal processing unit 40 in a primary signal path SP1 between the sound input 37 and the at least one primary sound output 38 and comprises a secondary signal processing unit 41 in a secondary signal path SP2 between the sound input SI and the at least one secondary sound output SO2. The primary signal processing unit 40 is designed to generate a primary coil signal SO1 based on the sound input signal SI and to feed the primary coil signal SO1 to the least one primary sound output 38. The primary signal processing unit 40 at least comprises a primary amplification stage 42, which is designed to amplify an input signal with a primary gain. The secondary signal processing unit 41 is designed to generate a secondary coil signal SO2 based on the sound input signal SI and to feed the secondary coil signal SO2 to the least one secondary sound output 39. The secondary signal processing unit 41 at least comprises a secondary amplification stage 43, which is designed to amplify an input signal with a secondary gain.

Additionally, the electronic sound signal circuit 36 comprises a phase shifting unit 44, which is designed to provide a phase shift Δφ between the primary coil signal SO1 and the secondary coil signal SO2. Beneficially, the phase shift Δφ is in a range of 60° to 300°.

Moreover, the electronic sound signal circuit 36 comprises a number of optional parts, the function of which is explained later. In detail, the electronic sound signal circuit 36 comprises an optional primary filter 45, an optional secondary filter 46, optional means to determine a back electromotive force 47, an optional combined EMF amplification and phase shifting stage 48, an optional compressor 49 and an optional splitter/symmetric amplifier 50.

The basic function of the electronic sound signal circuit 36 is as follows: The sound input signal SI is amplified by the primary amplification stage 42, and the primary coil signal SO1 is feed to the primary voice coil 3, which converts the primary coil signal SO1 into audible sound as was explained hereinbefore. The sound input signal SI moreover is phase shifted by the phase shifting unit 44 and the resulting signal is amplified by the secondary amplification stage 43. The secondary coil signal SO2 is feed to the secondary voice coil 7, which generates a counter momentum as was explained hereinbefore as well. In the embodiment of FIG. 16, the phase shifting unit 44 is arranged in the secondary signal path SP2. However, the phase shifting unit 44 equally can be arranged in the primary signal path SP1.

The primary gain and/or the secondary gain can be independent on a frequency of the sound input signal SI or can be dependent on the sound input signal SI. In more detail, the primary gain can be dependent on a frequency of the input signal of the primary amplification stage 42, and the secondary gain can be dependent on a frequency of the input signal of the secondary amplification stage 43.

The same counts for the phase shift Δφ, which can be frequency independent or which can be dependent on a frequency of the primary coil signal SO1 and the secondary coil signal SO2 respectively.

Generally, it is possible to tune the sound system 35 by use of an optional acceleration sensor 51, which is able to measure the acceleration of the electrodynamic actuator 1 or a device, which the electrodynamic actuator 1 is built into. In FIG. 16, the acceleration sensor 51 is mounted to the electrodynamic actuator 1. However, an acceleration sensor of the device, which the electrodynamic actuator 1 is built into, works as well. For example, the acceleration sensor can be part of a mobile phone, which the electrodynamic actuator 1 is built into, and can also be used for other tasks. A method of tuning a sound system 35 can comprise the following steps:

a) applying a sound input signal SI to the sound input 37 of a sound system 35;
b) measuring an acceleration of the electrodynamic actuator 1 or a device, which the electrodynamic actuator 1 is built into, by use of the acceleration sensor 51, wherein the acceleration is caused by the sound input signal SI;
c) changing the secondary gain and/or the phase shift Δφ until the measured acceleration is below a predefined threshold.

This is a first possibility of tuning the counter momentum of the movable part 33*a* . . . 33*c* of the secondary drive system 6. The acceleration sensor 51 can be mounted to the electrodynamic actuator 1 or to the device, which the electrodynamic actuator 1 is built into, permanently or temporarily (i.e. during the tuning procedure).

Beneficially, the primary gain, the secondary gain and the phase shift Δφ are set in a way that a total average acceleration of the electrodynamic actuator 1 caused by a movement of the primary voice coil 3 and the movable part 33*a* . . . 33*c* of the secondary drive system 6 is below 1 $m/s^2$, in particular in a frequency range of the sound input signal SI of 100 Hz to 15 kHz. In this way, an unwanted vibration induced into the electrodynamic actuator 1 is comparably low or even zero in a perfectly tuned system. The total average acceleration can be measured by means of the acceleration sensor 51 again.

In an alternative embodiment, the primary gain, the secondary gain and the phase shift Δφ can preferably be set in a way that a quotient of a primary excitation of the primary voice coil 3 caused by the primary coil signal SO1 and a secondary excitation of the movable part 33*a* . . . 33*c* of the secondary drive system 6 caused by the secondary coil signal SO2 equals a quotient of the mass of the movable part 33*a* . . . 33*c* of the secondary drive system 6 and mass of the primary voice coil 3 ±20%, in particular in a frequency range of the sound input signal SI of 20 Hz to 15 kHz. In this way, again an unwanted vibration induced into the electrodynamic actuator 1 is comparably low or even zero in a perfectly tuned system.

For example, the primary excitation can be determined by time integration of a back electromotive force of the primary voice coil 3, and the secondary excitation can be determined by time integration of a back electromotive force EMF of the secondary voice coil 7. The back electromotive force EMF of the secondary voice coil 7 can be measured by the means to determine the back electromotive force 47. Equally, the back electromotive force of the primary voice coil 3 can be measured by similar means in the primary signal path SP1. For details of the nature of the back electromotive force EMF, refer to the detailed explanation of the means to determine the back electromotive force 47 later in this text.

To improve the sound quality or simply to adjust the frequency response of the electrodynamic actuator 1 to personal preferences, the electronic sound signal circuit 36 can comprise the optional primary filter 45.

Similarly, the electronic sound signal circuit 36 can comprise the optional secondary filter 46, which is not for tuning sound, but for tuning the counter momentum function. For example, the secondary filter 46 can be a notch filter, wherein a ratio between a center frequency of the notch filter and a resonance frequency fres of the movable part 33*a* . . . 33*c* of the secondary drive system 6 is in a range of 0.9 to 1.1. In a method of tuning the sound system 35, a sound input signal SI can be applied to the sound input 37 of the sound system 35, a resonance frequency fres of the movable part 33*a* . . . 33*c* of the secondary drive system 6 can be measured and the center frequency of the notch filter can be set to the measured resonance frequency fres. In this way, the increased excursion of the movable part 33*a* . . . 33*c* due to the resonance effect at the resonance frequency fres of said movable part 33*a* . . . 33*c* may be controlled electronically.

Alternatively, the secondary filter 46 can have a filter function FF or filter curve which is the inverse frequency response FRS of the movable part 33*a* . . . 33*c* of the secondary drive system 6. In a method of tuning the sound system 35, a sound input signal SI can be applied to the sound input 37 of the sound system 35, a frequency response FRS of the movable part 33*a* . . . 33*c* of the secondary drive system 6 can be measured and the filter function FF or filter curve can be set to the inverse frequency response FRS. In this way, the increased excursion of the movable part 33*a* . . . 33*c* due to the resonance effect at the resonance frequency fres of said movable part 33*a* . . . 33*c* may be controlled electronically, too.

Figure 17:
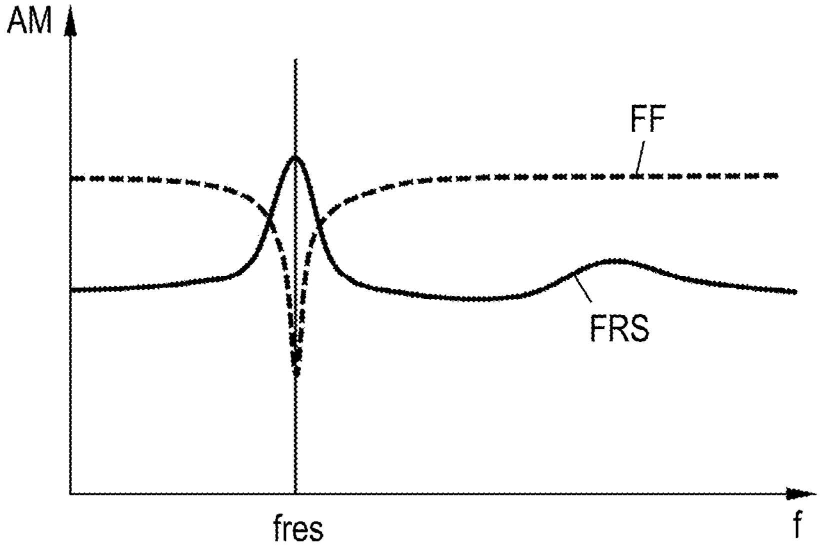

In the above context, FIG. 17 shows an exemplary diagram with the amplitude AM of the sound input signal SI on the vertical axis and with its frequency f on the horizontal axis. FIG. 17 on the one hand shows a graph of the frequency response FRS of the movable part 33*a* . . . 33*c* of the secondary drive system 6 (see solid line) and on the other hand shows the resonance frequency fres of the movable part 33*a* . . . 33*c* of the secondary drive system 6 and of the secondary filter 46. In addition, FIG. 17 shows a possible filter function FF of the secondary filter 46, which approximately is the inverse frequency response FRS (see broken line).

The above alternatives are possible solutions to tune the counter momentum function offline, e.g. during an initialization routine or just once for a series of electrodynamic actuators 1. However, it is also possible to monitor the movement of the movable part 33*a* . . . 33*c* of the secondary drive system 6 and to tune the counter momentum function "on the fly".

For this reason, the sound system 35 may comprise the means 47 to determine a back electromotive force EMF of the secondary coil 7 and may be designed to negatively feedback the back electromotive force EMF or a signal derived from the back electromotive force EMF into the secondary signal path SP2 as this is depicted in FIG. 16. In the embodiment of FIG. 16, the sound system 35 moreover comprises an optional combined EMF amplification and phase shifting stage 48, which is designed to generate the signal derived from the back electromotive force EMF by amplifying and phase shifting the back electromotive force EMF with an EMF gain and an EMF phase shift $\Delta_{\varphi EMF}$ respectively. In the given example, a combined EMF amplification and phase shifting stage 48 is used, however the sound system 35 may also comprise a distinct EMF amplification stage, which is designed to generate the signal derived from the back electromotive force EMF by amplifying the back electromotive force EMF with an EMF gain, and/or may comprise a distinct EMF phase shifting unit, which is designed to generate the signal derived from the back electromotive force EMF by phase shifting the back electromotive force EMF by an EMF phase shift $\Delta_{\varphi EMF}$. The EMF gain and/or the EMF phase shift $\Delta_{\varphi EMF}$ can be frequency independent or can be dependent on a frequency of the back electromotive force EMF.

The back electromotive force EMF is a voltage, which is indicative of the speed and the moving direction (up or down) of the secondary coil 7. If the weight of the movable part 33*a* . . . 33*c* is known, the momentum, which is the product of velocity and mass, can easily be determined. In other words, the back electromotive force EMF is also indicative of the momentum of the movable part 33*a* . . . 33*c* of the secondary drive system 6. By phase shifting the back electromotive force EMF, the negative feedback and thus a damping effect can be realized. The negative feedback avoids under- and overexcitation of the movable part 33*a* . . . 33*c* of the secondary drive system 6 and thus imbalance of the momenta of the primary voice coil 3 and the movable part 33*a* . . . 33*c* of the secondary drive system 6. By setting an appropriate EMF gain, the influence of the feedback signal can be set.

The back electromotive force EMF generally is generated by a movement of the movable part 33*a* . . . 33*c* of the secondary drive system 6 and counteracts the secondary coil signal SO2. Generally speaking, the back electromotive force EMF is the reason for the electric damping effect, which comes with all kinds of electrodynamic actuators and which is directly related to the force factor BL. This (natural) damping effect can be increased further by the proposed negative feedback of back electromotive force EMF or a signal derived from the back electromotive force EMF. Because the back electromotive force EMF depends on the speed of the movable part 33*a* . . . 33*c*, the back electromotive force EMF and hence the damping effect are particularly expressed at the resonance frequency of the movable part 33*a* . . . 33*c*. That means that a resonance of the movable part 33*a* . . . 33*c* is damped by the proposed measures, and although the physics behind the use of a secondary filter (notch filter) 46 and the use of the back electromotive force EMF are different, the resulting effect is similar. However, there is a major difference between the two approaches because the back electromotive force EMF and a damping effect exist regardless of the source of movement of the movable part 33*a* . . . 33*c*. The back electromotive force EMF is even generated if the movable part 33*a* . . . 33*c* is excited externally and if there is no sound input signal SI at all. In such a case, the back electromotive force EMF still dampens a movement of the movable part 33*a* . . . 33*c*, whereas the secondary filter 46 would not.

It should be noted at this point that using and setting a secondary filter 46 and using the back electromotive force EMF are possibilities which can complement one another and which can thus be used in common. For example, the secondary filter 46 can be used to roughly tune the counter momentum function, whereas the back electromotive force EMF is used for fine tuning. Moreover, the secondary filter 46 can be used for roughly tune the counter momentum function for a series of electrodynamic actuators 1, whereas the back electromotive force EMF is used for fine tuning of an individual electrodynamic actuator 1 of said series.

It should be noted at this point that otherwise than disclosed, the sound system 35 may comprise means to determine a back electromotive force of the primary voice coil 3, either for negatively feedback the back electromotive force or a signal derived from the back electromotive force into the primary signal path SP1 or for any other reason (e.g. for determining the primary excitation as noted hereinbefore). Equally, the back electromotive force EMF of the secondary voice coil 7 may be used for additional functions as well as the case may be (e.g. for determining the secondary excitation as noted hereinbefore).

In the aforementioned disclosure, reference has been made only to balancing the momenta of the primary voice coil 3 and the movable part 33*a* . . . 33*c* of the secondary drive system 6. However, one should also note that the primary voice coil 3 also works against air pressure, when the plate like structure 24 or membrane 27 is moved. This is an additional influence, which can be considered when tuning the sound system 35.

One additional (non-linear) influence is the compliance of the plate like structure 24 or membrane 27, which influences the damping of the primary oscillating system, which the primary voice coil 3 is part of. The secondary oscillating system, which the movable part 33*a* . . . 33*c* of the secondary drive system 6 is part of, has a completely different damping because of the missing plate like structure 24 or membrane 27. However, for perfectly balancing the momenta of the primary voice coil 3 and the movable part 33*a* . . . 33*c* of the secondary drive system 6, said difference shall be considered as well.

Figure 18:
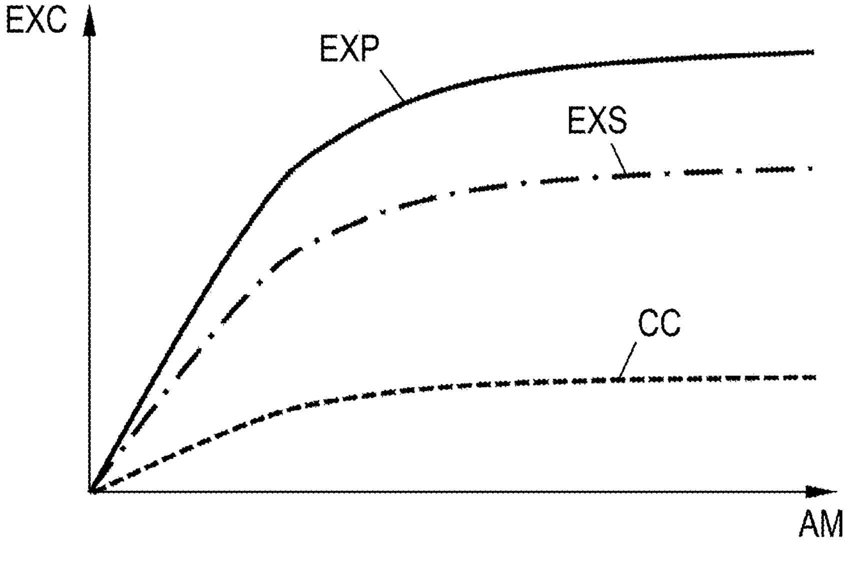

For this reason, the secondary signal processing 41 unit can comprise a compressor 49, which emulates or assists to emulate a non-linear and signal level dependent excitation EXP of the primary voice coil 3. In this context, FIG. 18 shows an exemplary diagram with the excitation EXC on the vertical axis and with the amplitude AM or the root mean square value of the sound input signal SI on the horizontal axis. FIG. 18 shows a graph of the nonlinear excitation EXP of the primary voice coil 3 on the top of FIG. 18 (see solid line). Moreover, FIG. 18 shows a graph of the nonlinear excitation EXS of the movable part 33*a* . . . 33*c* of the secondary drive system 6 (see dash dotted line). In a method of tuning a sound system 35, the following steps can be performed:

a) applying a sound input signal SI to the sound input 37 of the sound system 35;
b) measuring the non-linear and signal level dependent excitation EXP of the primary voice coil 3,
c) measuring the non-linear and signal level dependent excitation EXS of the movable part 33*a* . . . 33*c* of the secondary drive system 6; and
d) setting a compression curve CC of the compressor 49 according to a difference of the measured non-linear and signal level dependent excitation EXP of the primary voice coil 3 and the measured non-linear and signal level dependent excitation EXS of the movable part 33*a* . . . 33*c* of the secondary drive system 6 (see broken line in FIG. 18).

By use of the above measures, differences in the non-linear behavior of the primary oscillating system and the secondary oscillating system can be considered. Generally, the compressor 49 can be a single band compressor. However, in a more sophisticated approach, the compressor 49 can be a multiband compressor emulating or assisting to emulate a non-linear, signal level dependent and frequency dependent excitation EXP of the primary voice coil 3. In a method of tuning such a sound system 35, the following steps can be performed:

a) applying a sound input signal SI to the sound input 37 of the sound system 35;
b) measuring a non-linear, signal level dependent and frequency dependent excitation EXP of the primary voice coil 3;
c) measuring a non-linear, signal level dependent and frequency dependent excitation EXS of the movable part 33*a* . . . 33*c* of the secondary drive system 6; and
d) setting a compression curve CC of the compressor 49 according to a difference of the measured non-linear, signal level dependent and frequency dependent excitation EXP of the primary voice coil 3 and the measured non-linear, signal level dependent and frequency dependent excitation EXS of the movable part 33*a* . . . 33*c* of the secondary drive system 6.

One further part of the sound system 35, which has not been explained so far, is the splitter/symmetric amplifier 50, which in this embodiment generates antiphase signals for the sub coils 8*a*, 8*b*. So, strictly speaking, the secondary coil signal SO2 is not a single signal but comprises two antiphase signals. The same applies to the primary coil signal SO1 if there sub coils 20*a*, 20*b* are present (see FIG. 8).

In an alternative embodiment the splitter/symmetric amplifier 50 can be omitted, for example by connecting the sub coils 8*a*, 8*b* electrically in series and by creating the antiphase configuration by opposing winding directions of the sub coils 8*a*, 8*b*.

It should be noted that the invention is not limited to the above mentioned embodiments and exemplary working examples. Further developments, modifications and combinations are also within the scope of the patent claims and are placed in the possession of the person skilled in the art from the above disclosure. Accordingly, the techniques and structures described and illustrated herein should be understood to be illustrative and exemplary, and not limiting upon the scope of the present invention.

In particular, this means that the design of the movable part 33*a* . . . 33*c* as depicted in FIGS. 13 to 15 is independent of a particular one of the embodiments shown in FIGS. 1 to 12. Moreover, each embodiment of an electrodynamic actuator 1, 1*a* . . . 1*k* can be used for an electrodynamic transducer 23 or speaker 26 equivalently. Moreover, the segmentation of the primary magnet system 4, 4*a*, 4*b* as depicted in FIGS. 9 and 10 generally applies to the embodiments of electrodynamic actuators 1*a* . . . 1*d* and 1*g* . . . 1*k* depicted in the other figures. Any one of the electrodynamic actuators 1, 1*a* . . . 1*k* can be part of a sound system 35 as depicted in FIG. 16. One should also note that the sound system 35 can comprise any combination of the aforementioned optional parts and aforementioned optional functions as the case may be.

It is noted that the electrodynamic actuators 1, 1*a* . . . 1*k* of the kind disclosed herein are not limited to be used for vibration compensation, but may also be used in applications, where sound both is transmitted via air conduction and bone conduction. For example, a headphone with an electrodynamic actuator 1, 1*a* . . . 1*k* of the disclosed kind can be placed on a user's head in a way that sound reaches the eardrum of the user over the air but is also transmitted to the cochlea via the user's skull bones. For example, a speaker 26 like it is depicted in FIG. 12 can be used for such an application.

In this context it is also noted that the primary coil signal SO1 and the secondary coil signal SO2 may be generated based on the sound input signal SI in any desired way to provide a satisfying sound impression to the user. For example, some frequency bands may be more present in the primary coil signal SO1, whereas others may be more present in the secondary coil signal SO2. In a simple embodiment, a frequency crossover may be used to split the sound input signal SI into a first frequency band, on which the primary coil signal SO1 is based, and a second frequency band, on which the secondary coil signal SO2 is based. Of course, frequency bands may generally overlap. In another example, the electrodynamic actuator 1, 1*a* . . . 1*k* may be switched between air conduction and bone conduction. That means that sound is either transmitted via the air or via the user's skull bones. In the latter case, sound produced by the electrodynamic actuator 1, 1*a* . . . 1*k* may be inaudible for other persons than the user of the headphones.

In the above context, reference is now made to the sound system 35, which in parts may be used for the air conduction/bone conduction application. For example, the primary filter 45, and the secondary filter 46 may be used for this application, and other parts of the sound system 35 may be omitted. However, the sound system 35 can be used for the air conduction/bone conduction application as it is if it is not tuned for perfect vibration compensation but tweaked in a way that a remaining vibration forms the desired signal for the bone conduction. In this context, one should note that the primary voice coil 3, whose primary use is to produce sound audible over the air, also induces vibrations, which are audible via bone conduction. So, one has to realize that both the primary coil signal SO1 and the secondary coil signal SO2 lead to sound audible via bone conduction, and it is not the case that only the secondary coil signal SO2 produces sound audible via bone conduction. So, in a way, the air conduction/bone conduction use case may be seen as an application with vibration compensation, which is imperfect in a desired manner. In that, the skilled in the art will understand that the whole technical disclosure is applicable to the air conduction/bone conduction use case, but the aim when tuning the sound system 35 is not zero vibration but intended or desired vibration.

It is noted that the technical disclosure related to the air conduction/bone conduction use case without limitation also relates to the embodiments of the electrodynamic actuators 1*a* of FIGS. 1 to 4, where the outer center magnet 5 is replaced by a soft iron part or a non-iron part.

Finally it is noted that the scope of the present invention is defined by the appended claims, including known equivalents and unforeseeable equivalents at the time of filing of this application. Although numerous embodiments of this invention have been described above with a certain degree of particularity, those skilled in the art could make numerous alterations to the disclosed embodiments without departing from the spirit or scope of this disclosure.

LIST OF REFERENCES

1, 1*a* . . . 1*k* electrodynamic actuator
2*a*, 2*b* primary drive system
3, 3*a* . . . 3*d* primary voice coil
4, 4*a*, 4*b* primary magnet system
5 outer center magnet
6 secondary drive system
7 secondary voice coil
8*a*, 8*b* secondary sub coil
9 secondary magnet system
10 inner center magnet
11 outer center top plate
12*a* . . . 12*c* bottom magnet system region
13*a* . . . 13*c* peripheral magnet system region
14*a* . . . 14*c*" bottom plate
15 outer magnet
16 outer top plate
17 inner center top plate
18 inner center bottom plate
19 angled extension
20*a*, 20*b* primary sub coil
21 primary bridge part
22*a* . . . 22*d* segment
23 electrodynamic transducer
24 plate like structure
25 mounting base
26 speaker
27 membrane
28 flexible membrane part
29 rigid membrane part
30 frame
31 primary spring
32 secondary spring
33*a* . . . 33*c* movable part of secondary drive system
34 secondary bridge part
35 sound system
36 electronic sound signal circuit
37 sound input
38 primary sound output
39 secondary sound output
40 primary signal processing unit
41 secondary signal processing unit
42 primary amplification stage
43 secondary amplification stage
44 phase shifting unit
45 primary filter
46 secondary filter
47 means to determine back electromotive force
48 combined EMF amplification and phase shifting stage
49 compressor
50 splitter/symmetric amplifier
51 acceleration sensor
Δφ phase shift
Φ1 primary magnetic flux
Φ2 secondary magnetic flux
d total thickness of electrodynamic actuator
f frequency
fres resonance frequency
Ip primary current
Is secondary current
w1 width of outer center magnet
w2 width of inner center magnet
A1 primary coil axis
A2 secondary coil axis
AC annular course
AM amplitude
CC compression curve
E1 primary excursion direction
E2 secondary excursion direction
EMF back electromagnetic force
EXC excitation
EXP excitation primary voice coil
EXS excitation movable part secondary drive system
FF filter function
FRS frequency response movable part secondary drive system
L1 primary loop section
L2 secondary loop section
M1 magnetizing direction of outer center magnet
M2 magnetizing direction of inner center magnet
M3 magnetizing direction of outer magnet
O1 center opening of primary voice coil
O2 center opening of primary magnet system
O3 center opening of secondary voice coil
SE sound emanating surface
SI sound input signal
SM flat mounting surface
SO1 primary coil signal
SO2 secondary coil signal
SP1 primary signal path
SP2 secondary signal path

What is claimed is:

1. Electrodynamic actuator (1, 1*a* . . . 1*k*), which in particular is designed to be connected to a plate like structure (24) or membrane (27), wherein the electrodynamic actuator (1, 1*a* . . . 1*k*) comprises:

a primary drive system (2*a*, 2*b*), which comprises at least one annular primary voice coil (3, 3*a* . . . 3*d*) with a center opening (O1) and an annular primary magnet system (4, 4*a*, 4*b*) with a center opening (O2) and with an annular outer center magnet (5) or outer magnets (15), wherein the at least one primary voice coil (3, 3*a* . . . 3*d*) has an primary electrical conductor in the shape of loops running around a primary coil axis (A1) in a primary loop section (L1) and wherein the primary magnet system (4, 4*a*, 4*b*) is designed to generate a primary magnetic flux (Φ1) transverse to the primary electrical conductor in the primary loop section (L1), and wherein the primary voice coil (3, 3*a* . . . 3*d*) is movably coupled to the primary magnet system (4, 4*a*, 4*b*), and wherein the electrodynamic actuator (1, 1*a* . . . 1*k*) additionally comprises:

a secondary drive system (6), which comprises at least one annular secondary voice coil (7) with a center opening (O3) and a secondary magnet system (9) with an inner center magnet (10), wherein the at least one secondary voice coil (7) has a secondary electrical conductor in the shape of loops running around a secondary coil axis (A2) in a secondary loop section (L2) and wherein the primary magnet system (4, 4*a*, 4*b*) and the secondary magnet system (9) are designed to generate a secondary magnetic flux (Φ2) transverse to the secondary electrical conductor in the secondary loop section (L2), wherein the secondary drive system (6) is arranged in the center opening (O2) of the primary magnet system (4, 4*a*, 4*b*), wherein the inner center magnet (10) is arranged in the center opening (O3) of the at least one secondary voice coil (7) and wherein a movable part (33*a* . . . 33*c*) of the secondary drive system (6), which comprises or is formed by the at least one secondary voice coil (7) and/or the inner center magnet (10), is movably coupled to the primary magnet system (4, 4*a*, 4*b*).

2. The electrodynamic actuator according (1, 1*a* . . . 1*k*) to claim 1, wherein the magnetizing direction (M1) of the outer center magnet (5) and the magnetizing direction (M2) of the inner center magnet (10) are opposed to each other.

3. The electrodynamic actuator (1, 1*a* . . . 1*k*) according to claim 1, wherein the magnetizing direction (M1) of the outer center magnet (5) and the magnetizing direction (M2) of the inner center magnet (10) each are oriented parallel to the primary coil axis (A1) and/or the secondary coil axis (A2).

4. The electrodynamic actuator (1, 1*a* . . . 1*k*) according to claim 1, wherein the coupling between the primary voice coil (3, 3*a* . . . 3*d*) and the primary magnet system (4, 4*a*, 4*b*) allows a relative movement of the primary voice coil (3, 3*a* . . . 3*d*) in a primary excursion direction (E1) parallel to the primary coil axis (A1) and/or the secondary coil axis (A2).

5. The electrodynamic actuator (1, 1*a* . . . 1*k*) according to claim 1, wherein the coupling between the primary magnet system (4, 4*a*, 4*b*) and the movable part (33*a* . . . 33*c*) of the secondary drive system (6) allows a relative movement of said movable part (33*a* . . . 33*c*) in a secondary excursion direction (E2) parallel to the primary coil (A1) axis and/or the secondary coil axis (A2).

6. The electrodynamic actuator (1, 1*a* . . . 1*k*) according to claim 1, wherein the primary magnet system (4, 4*a*, 4*b*) additionally comprises:

an annular outer center top plate (11), which is provided for guiding the primary magnetic flux (Φ1) and the secondary magnetic flux (Φ2), wherein the outer center top plate (11) comprises a center opening and is arranged in the center opening (O1) of the primary voice coil (3, 3*a* . . . 3*d*) and axially above the outer center magnet (5);

a bottom magnet system region (12*a* . . . 12*c*), which is provided for guiding the primary magnetic flux (Φ1) and the secondary magnetic flux (Φ2), wherein the bottom magnet system region (12*a* . . . 12*c*) comprises a center opening and is arranged axially below the outer center magnet (5) and reaches radially over the primary voice coil (3, 3*a* . . . 3*d*); and a peripheral magnet system region (13*a* . . . 13*c*), which is provided for guiding and/or generating the primary magnetic flux (Φ1) and which is arranged above the bottom region (12*a* . . . 12*c*) and out of the at least one primary voice coil (3, 3*a* . . . 3*d*), wherein the outer center magnet (5) is arranged in the center opening (O1) of the at least one primary voice coil (3, 3*a* . . . 3*d*) and wherein the center openings of the outer center magnet (5), the outer center top plate (11) and the bottom magnet system region (12*a* . . . 12*c*) form the center opening (O2) of the primary drive system (2*a*, 2*b*).

7. The electrodynamic actuator (1, 1*a* . . . 1*k*) according to claim 1, wherein the peripheral magnet system region (13*a* . . . 13*c*) is one of:

annular and together with the bottom magnet system region (12*a* . . . 12*c*) forms a single part;

formed by angled extensions (19) of the bottom magnet system region (12*a* . . . 12*c*); or comprises outer magnets (15) and at least one outer top plate (16), which is provided for guiding the primary magnetic flux (Φ1) and which is arranged axially above the outer magnets (15), wherein the magnetizing direction (M3) of the outer magnets (15) each is oriented parallel to the primary coil axis (A1) and/or the secondary coil axis (A2) and opposed to the magnetizing direction (M1) of the outer center magnet (5).

8. The electrodynamic actuator (1, 1*a* . . . 1*k*) according to claim 1, wherein the secondary magnet system (9) additionally comprises:

an inner center top plate (17), which is provided for guiding the secondary magnetic flux (Φ2) and which is arranged in the center opening (O3) of the at least one secondary voice coil (7) and axially above the inner center magnet (10); and an inner center bottom plate (18), which is provided for guiding the secondary magnetic flux (Φ2) and which is arranged in the center opening (O3) of the at least one secondary voice coil (7) and axially below the inner center magnet (10).

9. The electrodynamic actuator (1, 1*a* . . . 1*k*) according to claim 1, wherein the at least one annular secondary voice coil (7) and the inner center magnet (10) are part of or form the movable part (33*a* . . . 33*c*) of the secondary drive system (6) and are fixedly connected to each other and movably coupled to the primary magnet system (4, 4*a*, 4*b*), or the at least one annular secondary voice coil (7) is fixedly connected to the primary magnet system (4, 4*a*, 4*b*) and the inner center magnet (10) is part of or forms the movable part (33*a* . . . 33*c*) of the secondary drive system (6) and is movably coupled to the at least one annular secondary voice coil (7) and the primary magnet system (4, 4*a*, 4*b*), or the inner center magnet (10) is fixedly connected to the primary magnet system (4, 4*a*, 4*b*) and the at least one annular secondary voice coil (7) is part of or forms the movable part (33*a* . . . 33*c*) of the secondary drive system (6) and is movably coupled to the inner center magnet (10) and the primary magnet system (4, 4*a*, 4*b*).

10. The electrodynamic actuator (1, 1*a* . . . 1*k*) according to claim 1, wherein at least one of the coupling between the at least one annular primary voice coil (3, 3*a* . . . 3*d*) and the primary magnet system (4, 4*a*, 4*b*) is provided by primary springs (31), and/or at least one of the coupling between the primary magnet system (4, 4*a*, 4*b*) and the movable part (33*a* . . . 33*c*) of the secondary drive system (6) is provided by secondary springs (32).

11. The electrodynamic actuator (1, 1*a* . . . 1*k*) according to claim 10, wherein the primary springs (31) are provided to supply electric power to the at least one annular primary voice coil (3, 3*a* . . . 3*d*) and/or wherein the secondary springs (32) are provided to supply electric power to the at least one annular secondary voice coil (7).

12. The electrodynamic actuator (1, 1*a* . . . 1*k*) according to claim 1, wherein at least one of the annular outer center top plate (11), the bottom magnet system region (12*a* . . . 12*c*), the peripheral magnet system region (13*a* . . . 13*c*), the inner center top plate (17), the inner center bottom plate (18) and/or the outer top plate (16) is made of soft iron.

13. The electrodynamic actuator (1, 1*a* . . . 1*k*) according to claim 1, wherein either the primary coil axis (A1) and the secondary coil axis (A2) are parallel to each other and spaced from each other, or the primary coil axis (A1) and the secondary coil axis (A2) coincide.

14. The electrodynamic actuator (1, 1*a* . . . 1*k*) as claimed in claim 1, wherein the at least one primary voice coil (3, 3*a* . . . 3*d*) comprises a first primary sub coil (20*a*) and a second primary sub coil (20*b*), which have equal shape and are stacked over one another, and/or the at least one secondary voice coil (7) comprises a first secondary sub coil (8*a*) and a second secondary sub coil (8*b*), which have equal shape and are stacked over one another.

15. The electrodynamic actuator (1, 1*a* . . . 1*k*) as claimed in claim 1, wherein a width (w1) of the outer center magnet (5), which is half the difference of an outer dimension of the outer center magnet (5) in a direction perpendicular to an annular course (AC) of the outer center magnet (5) minus the inner dimension of the outer center magnet (5) in said direction, is in a range of 0.1 to 2.0 times the smallest extension (w2) of the inner center magnet (10) in a direction perpendicular to the primary coil axis (A1).

16. The electrodynamic actuator (1, 1*a* . . . 1*k*) as claimed in claim 1, wherein a total thickness (d) of the electrodynamic actuator (1, 1*a* . . . 1*k*) is lower than 10 mm.

17. The electrodynamic actuator (1, 1*a* . . . 1*k*) as claimed in claim 1, wherein the at least one secondary voice coil (7) has an oval shape, and the at least one primary voice coil (3, 3*a* . . . 3*d*) is rectangular with rounded corners.

18. The electrodynamic actuator (1, 1*a* . . . 1*k*) as claimed in claim 1, wherein the mass of the movable part (33*a* . . . 33*c*) of the secondary drive system (6) is at least two times the mass of the at least one primary voice coil (3, 3*a* . . . 3*d*).

19. The electrodynamic actuator (1, 1*a* . . . 1*k*) as claimed in claim 1, wherein the at least one primary voice coil (3, 3*a* . . . 3*d*) comprises a flat mounting surface (SM), which is intended to be connected to the plate like structure (24) or the membrane (27).

20. An electrodynamic transducer (23), comprising a plate like structure (24) and an electrodynamic actuator (1, 1*a* . . . 1*k*) connected to the plate like structure (24), wherein the electrodynamic actuator (1, 1*a* . . . 1*k*) is designed according to claim 1.

21. The electrodynamic transducer (23) as claimed in claim 20, wherein an average sound pressure level of the electrodynamic transducer (23) measured in an orthogonal distance of 10 cm from the sound emanating surface (SE) is at least 50 dB_SPL in a frequency range from 100 Hz to 15 kHz.

22. An output device comprising an electrodynamic transducer (23) as claimed in claim 20, wherein the plate like structure (24) is embodied as a display, and wherein the electrodynamic actuator (1, 1*a* . . . 1*k*) is connected to the backside of the display.

23. A speaker (26), comprising an electrodynamic actuator as claimed in claim 1 and a membrane (27), which is fixed thereto.

24. A sound system (35), comprising:

an output device as claimed in claim 22;

an electronic sound signal circuit (36) having a sound input (37) being designed to receive a sound input signal (SI);

at least one primary sound output (38), which is connected to the at least one primary voice coil (3, 3*a* . . . 3*d*) of the electrodynamic actuator (1, 1*a* . . . 1*k*) or to sub coils (20*a*, 20*b*) of said primary voice coil (3, 3*a* . . . 3*d*) respectively;

at least one secondary sound output (39), which is connected to the at least one secondary voice coil (7) of the electrodynamic actuator (1, 1*a* . . . 1*k*) or to sub coils (8*a*, 8*b*) of said secondary voice coil (7) respectively;

a primary signal processing unit (40) in a primary signal path (SP1) between the sound input (37) and the at least one primary sound output (38), wherein the primary signal processing unit (40) is designed to generate a primary coil signal (SO1) based on the sound input signal (SI) and to feed the primary coil signal (SO1) to the least one primary sound output (38) and wherein the primary signal processing unit (40) at least comprises a primary amplification stage (42), which is designed to amplify an input signal with a primary gain;

a secondary signal processing unit (41) in a secondary signal path (SP2) between the sound input (SI) and the at least one secondary sound output (39), wherein the secondary signal processing unit (41) is designed to generate a secondary coil signal (SO2) based on the sound input signal (SI) and to feed the secondary coil signal (SO2) to the least one secondary sound output (39) and wherein the secondary signal processing unit (41) at least comprises a secondary amplification stage (43), which is designed to amplify an input signal with a secondary gain; and a phase shifting unit (44), which is designed to provide a phase shift ($\Delta\varphi$) between the primary coil signal (SO1) and the secondary coil signal (SO2).

25. The sound system (35) according to claim 24, wherein the phase shift ($\Delta\varphi$) is in a range of 60° to 300°.

26. The sound system (35) according to claim 24, wherein the secondary gain is dependent on a frequency of the input signal of the secondary amplification stage (43) and/or the phase shift ($\Delta\varphi$) is dependent on a frequency of the primary coil signal (SO1) and the secondary coil signal (SO2) respectively.

27. The sound system (35) according to claim 24, wherein the primary gain, the secondary gain and the phase shift ($\Delta\varphi$) are set in a way that a total average acceleration of the electrodynamic actuator (1, 1*a* . . . 1*k*) caused by a movement of the primary voice coil (3, 3*a* . . . 3*d*) and the movable part (33*a* . . . 33*c*) of the secondary drive system (6) is below 1 m/s$^2$, in particular in a frequency range of the sound input signal (SI) of 100 Hz to 15 kHz.

28. The sound system (35) according to claim 24, wherein the primary gain, the secondary gain and the phase shift ($\Delta\varphi$) are set in a way that a quotient of a primary excitation of the primary voice coil (3, 3*a* . . . 3*d*) caused by the primary coil signal (SO1) and a secondary excitation of the movable part (33*a* . . . 33*c*) of the secondary drive system (6) caused by the secondary coil signal (SO2) equals a quotient of the mass of the movable part (33*a* . . . 33*c*) of the secondary drive system (6) and mass of the primary voice coil (3, 3*a* . . . 3*d*) ±20%, in particular in a frequency range of the sound input signal (SI) of 20 Hz to 15 kHz.

29. The sound system (35) according to claim 24, wherein the secondary signal processing unit (41) comprises a secondary filter (46), wherein a) the secondary filter (46) is a notch filter and a ratio between a center frequency of the notch filter and a resonance frequency (fres) of a movable part (33*a* . . . 33*c*) of the secondary drive system (6) is in a range of 0.9 to 1.1, or b) the secondary filter (46) has a filter function (FF) or filter curve which is the inverse frequency response (FRS) of the movable part (33*a* . . . 33*c*) of the secondary drive system (6).

30. The sound system (35) according to claim 24, wherein the secondary signal processing unit (41) comprises means (47) to determine a back electromotive force (EMF) of the secondary coil (7) and is designed to negatively feedback the back electromotive force (EMF) or a signal derived from the back electromotive force (EMF) into the secondary signal path (SP2).

31. The sound system (35) according to claim 30, wherein the secondary signal processing unit (41) comprises:

an EMF amplification stage, which is designed to generate the signal derived from the back electromotive force (EMF) by amplifying the back electromotive force (EMF) with an EMF gain;

or an EMF phase shifting unit, which is designed to generate the signal derived from the back electromotive force (EMF) by phase shifting the back electromotive force (EMF) by an EMF phase shift ($\Delta_{\varphi EMF}$); or a combined EMF amplification and phase shifting stage (48), which is designed to generate the signal derived from the back electromotive force (EMF) by amplifying and phase shifting the back electromotive force (EMF) with an EMF gain and an EMF phase shift ($\Delta_{\varphi EMF}$) respectively.

32. The sound system (35) according to claim 31, wherein the EMF gain and/or the EMF phase shift ($\Delta_{\varphi EMF}$) is/are dependent on a frequency of the back electromotive force (EMF).

33. The sound system (35) according to claim 24, wherein the secondary signal processing (41) unit comprises a compressor (49), which emulates or assists to emulate a non-linear and signal level dependent excitation (EXP) of the primary voice coil (3, 3*a* . . . 3*d*).

34. The sound system (35) according to claim 33, wherein the compressor (49) is a multiband compressor emulating or assisting to emulate a non-linear, signal level dependent and frequency dependent excitation (EXP) of the primary voice coil (3, 3*a* . . . 3*d*).

35. A method of tuning a sound system (35), comprising the steps of:

applying a sound input signal (SI) to the sound input (37) of a sound system (35) according to claim 24' measuring an acceleration of the electrodynamic actuator (1, 1*a* . . . 1*k*) or a device, which the electrodynamic actuator (1, 1*a* . . . 1*k*) is built into, by use of an acceleration sensor (51), wherein the acceleration is caused by the sound input signal (SI), and changing the secondary gain and/or the phase shift ($\Delta\varphi$) until the measured acceleration is below a predefined threshold.

36. A method of tuning a sound system (35), comprising the steps of:

applying a sound input signal (SI) to the sound input (37) of a sound system (35) according to claim 29;

measuring a resonance frequency of the movable part (33*a* . . . 33*c*) of the secondary drive system (6) and setting the center frequency of the notch filter to the measured resonance frequency (fres) in case a), or measuring a frequency response (FRS) of the movable part (33*a* . . . 33*c*) of the secondary drive system (6) and setting the filter function (FF) or filter curve to the inverse frequency response (FRS) in case *b*).

37. A method of tuning a sound system (35), comprising the steps of:

applying a sound input signal (SI) to the sound input (37) of a sound system (35) according to claim 33;

measuring a non-linear and signal level dependent excitation (EXP) of the primary voice coil (3, 3*a* . . . 3*d*);

measuring a non-linear and signal level dependent excitation (EXS) of the movable part (33*a* . . . 33*c*) of the secondary drive system (6); and setting a compression curve (CC) of the compressor (49) according to a difference of the measured non-linear and signal level dependent excitation (EXP) of the primary voice coil (3, 3*a* . . . 3*d*) and the measured non-linear and signal level dependent excitation (EXS) of the movable part (33*a* . . . 33*c*) of the secondary drive system (6).

38. A method of tuning a sound system (35), comprising the steps of:

applying a sound input signal (SI) to the sound input (37) of a sound system (35) according to claim 34;

measuring a non-linear, signal level dependent and frequency dependent excitation (EXP) of the primary voice coil (3, 3*a* . . . 3*d*);

measuring a non-linear, signal level dependent and frequency dependent excitation (EXS) of the movable part (33*a* . . . 33*c*) of the secondary drive system (6); and setting a compression curve (CC) of the compressor (49) according to a difference of the measured non-linear, signal level dependent and frequency dependent excitation (EXP) of the primary voice coil (3, 3*a* . . . 3*d*) and the measured non-linear, signal level dependent and frequency dependent excitation (EXS) of the movable part (33*a* . . . 33*c*) of the secondary drive system (6).

* * * * *